(12) United States Patent  (10) Patent No.: US 8,463,770 B1
Thirumalai et al.  (45) Date of Patent: Jun. 11, 2013

(54) SYSTEM AND METHOD FOR CONDITIONING SEARCH RESULTS

(75) Inventors: Srikanth Thirumalai, Clyde Hill, WA (US); Erik W. Selberg, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 511 days.

(21) Appl. No.: 12/170,195

(22) Filed: Jul. 9, 2008

(51) Int. Cl.
*G06F 7/00* (2006.01)
*G06F 17/30* (2006.01)

(52) U.S. Cl.
USPC ............ 707/722; 707/692; 707/749; 707/797

(58) Field of Classification Search
USPC .................................. 707/722, 692, 797, 749
See application file for complete search history.

(56) References Cited

U.S. PATENT DOCUMENTS

| | | | |
|---|---|---|---|
| 5,913,208 A * | 6/1999 | Brown et al. ................. | 707/706 |
| 6,182,063 B1 * | 1/2001 | Woods .......................... | 707/722 |
| 6,263,348 B1 | 7/2001 | Kathrow et al. | |
| 6,615,209 B1 | 9/2003 | Gomes et al. | |
| 6,658,423 B1 | 12/2003 | Pugh et al. | |
| 7,139,756 B2 * | 11/2006 | Cooper et al. ......................... | 1/1 |
| 2004/0093323 A1 * | 5/2004 | Bluhm et al. ....................... | 707/3 |
| 2005/0131760 A1 * | 6/2005 | Manning et al. ................. | 705/14 |
| 2006/0173822 A1 * | 8/2006 | Watson et al. ..................... | 707/3 |
| 2008/0077558 A1 * | 3/2008 | Lawrence et al. ................. | 707/3 |
| 2009/0089314 A1 * | 4/2009 | Hicks ........................... | 707/102 |
| 2009/0132561 A1 * | 5/2009 | Cormode et al. ............. | 707/100 |

* cited by examiner

*Primary Examiner* — Shew-Fen Lin
(74) *Attorney, Agent, or Firm* — Robert C. Kowert; Meyertons, Hood, Kivlin, Kowert & Goetzel, P.C.

(57) ABSTRACT

Various embodiments of a system and method for conditioning search results are described. The system and method for conditioning search results may include a search result conditioning component. The search result conditioning component may be configured to determine a search result group including multiple search results each corresponding to an item offered for sale; such search results may be results of a search query. The search result conditioning component may be configure to modify the search result group by removing one or more search results from the search result group in response to determining that a measure of similarity between the one or more search results and other search results of the search result group is greater than a requisite measure of similarity (e.g., a threshold). The search result conditioning component may be configured to output the modified search result group.

30 Claims, 19 Drawing Sheets

| | B000KENT9K | B000SZOOHM | B000PPLHOI | B000P7XQ40 | B000PXNLK8 | B000PMJ23E | B000UO66TK | B000PGE8L6 |
|---|---|---|---|---|---|---|---|---|
| B000KENT9K | N/A | .25 | .80 | .32 | .30 | .41 | .54 | .85 |
| B000SZOOHM | .25 | N/A | .82 | .45 | .44 | .37 | .62 | .48 |
| B000PPLHOI | .80 | .82 | N/A | .85 | .87 | .92 | .36 | .89 |
| B000P7XQ40 | .32 | .45 | .85 | N/A | .22 | .36 | .66 | .95 |
| B000PXNLK8 | .30 | .44 | .87 | .22 | N/A | .71 | .52 | .89 |
| B000PMJ23E | .41 | .37 | .92 | .36 | .71 | N/A | .47 | .83 |
| B000UO66TK | .54 | .62 | .36 | .66 | .52 | .47 | N/A | .11 |
| B000PGE8L6 | .85 | .48 | .89 | .95 | .89 | .83 | .11 | N/A |

FIG. 5

| | B000KENT9K | B000SZOOHM | B000PPLHOI | B000P7XQ40 | B000PXNLK8 | B000PMJ23E | B000UO66TK | B000PGE8L6 |
|---|---|---|---|---|---|---|---|---|
| B000KENT9K | N/A | no | yes | no | no | no | no | yes |
| B000SZOOHM | no | N/A | yes | yes | no | no | no | no |
| B000PPLHOI | yes | yes | N/A | yes | yes | yes | no | yes |
| B000P7XQ40 | no | yes | yes | N/A | no | no | no | yes |
| B000PXNLK8 | no | no | yes | no | N/A | yes | no | yes |
| B000PMJ23E | no | no | yes | no | yes | N/A | no | yes |
| B000UO66TK | no | no | no | no | no | no | N/A | no |
| B000PGE8L6 | yes | no | yes | yes | yes | yes | no | N/A |

FIG. 6

| | search result | search results having a requisite measure of similarity with respect to the search result | lexicographical sort of search result and search results having a requisite measure of similarity with respect to the search result | label assigned to search result (earliest identifier of lexicographical sort) |
|---|---|---|---|---|
| 1340 | B000KENT9K | B000PPLHOI, B000PGE8L6 | B000KENT9K, B000PGE8L6, B000PPLHOI | B000KENT9K |
| 1345 | B000SZOOHM | B000PPLHOI | B000PPLHOI, B000SZOOHM | B000PPLHOI |
| 1350 | B000PPLHOI | B000SZOOHM, B000PXNLK8, B000KENT9K, B000PGE8L6, B000PMJ23E, B000P7XQ40 | B000KENT9K, B000P7XQ40, B000PGE8L6, B000PMJ23E, B000PPLHOI, B000PXNLK8, B000SZOOHM | B000KENT9K |
| 1355 | B000P7XQ40 | B000PPLHOI, B000PGE8L6 | B000P7XQ40, B000PGE8L6, B000PPLHOI | B000P7XQ40 |
| 1360 | B000PXNLK8 | B000PPLHOI, B000PGE8L6 | B000PGE8L6, B000PPLHOI, B000PXNLK8 | B000PGE8L6 |
| 1365 | B000PMJ23E | B000PPLHOI, B000PGE8L6 | B000PGE8L6, B000PMJ23E, B000PPLHOI | B000PGE8L6 |
| 1370 | B000UO66TK | <none> | B000UO66TK | B000UO66TK |
| 1375 | B000PGE8L6 | B000PXNLK8, B000KENT9K, B000PPLHOI, B000PMJ23E, B000P7XQ40 | B000KENT9K, B000P7XQ40, B000PGE8L6, B000PMJ23E, B000PPLHOI, B000PXNLK8 | B000KENT9K |

FIG. 13

| 1500 → search result | 1510 → degree of search result | 1520 → degree based sort of search result and other search results having a requisite measure of similarity with respect to the search result | 1530 → label assigned to search result (identifier of highest sorted search result) |
|---|---|---|---|
| 1540 → B000KENT9K | 2 | B000PPLHOI, B000PGE8L6, B000KENT9K | B000PPLHOI |
| 1545 → B000SZOOHM | 1 | B000PPLHOI, B000SZOOHM | B000PPLHOI |
| 1550 → B000PPLHOI | 6 | B000PPLHOI, B000PGE8L6, B000KENT9K, B000P7XQ40, B000PMJ23E, B000PXNLK8, B000SZOOHM | B000PPLHOI |
| 1555 → B000P7XQ40 | 2 | B000PPLHOI, B000PGE8L6, B000P7XQ40 | B000PPLHOI |
| 1560 → B000PXNLK8 | 2 | B000PPLHOI, B000PGE8L6, B000PXNLK8 | B000PPLHOI |
| 1565 → B000PMJ23E | 2 | B000PPLHOI, B000PGE8L6, B000PMJ23E | B000PPLHOI |
| 1570 → B000UO66TK | 0 | B000UO66TK | B000UO66TK |
| 1575 → B000PGE8L6 | 5 | B000PPLHOI, B000PGE8L6, B000KENT9K, B000P7XQ40, B000PMJ23E, B000PXNLK8 | B000PPLHOI |

FIG. 15

| | search result | label | set of covered labels | display search result? |
|---|---|---|---|---|
| 1740 | B000KENT9K | B000KENT9K | B000KENT9K | yes |
| 1745 | B000SZOOHM | B000PPLHOI | B000KENT9K, B000PPLHOI | yes |
| 1750 | B000PPLHOI | B000KENT9K | B000KENT9K, B000PPLHOI | no |
| 1755 | B000P7XQ40 | B000P7XQ40 | B000KENT9K, B000PPLHOI, B000P7XQ40 | yes |
| 1760 | B000PXNLK8 | B000PGE8L6 | B000KENT9K, B000PPLHOI, B000P7XQ40, B000PGE8L6 | yes |
| 1765 | B000PMJ23E | B000PGE8L6 | B000KENT9K, B000PPLHOI, B000P7XQ40, B000PGE8L6 | no |
| 1770 | B000UO66TK | B000UO66TK | B000KENT9K, B000PPLHOI, B000P7XQ40, B000PGE8L6, B000UO66TK | yes |
| 1775 | B000PGE8L6 | B000KENT9K | B000KENT9K, B000PPLHOI, B000P7XQ40, B000PGE8L6, B000UO66TK | no |

FIG. 17

| search result | label | set of covered labels | display search result? |
|---|---|---|---|
| B000KENT9K | B000PPLHOI | B000PPLHOI | yes |
| B000SZOOHM | B000PPLHOI | B000PPLHOI | no |
| B000PPLHOI | B000PPLHOI | B000PPLHOI | no |
| B000P7XQ40 | B000PPLHOI | B000PPLHOI | no |
| B000PXNLK8 | B000PPLHOI | B000PPLHOI | no |
| B000PMJ23E | B000PPLHOI | B000PPLHOI | no |
| B000UO66TK | B000UO66TK | B000PPLHOI, B000UO66TK | yes |
| B000PGE8L6 | B000PPLHOI | B000PPLHOI, B000UO66TK | no |

FIG. 20

SYSTEM AND METHOD FOR CONDITIONING SEARCH RESULTS

BACKGROUND

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Various applications of the Internet, and of the web, involve marketplaces that provide goods and/or services for sale. For instance, consumers may visit a merchant's website to view and/or purchase goods and services offered for sale by the merchant (and/or third party merchants). Some network-based marketplaces (e.g., Internet- or web-based marketplaces) include large catalogues of items offered for sale. To assist consumers with locating items sought for purchase, many network-based marketplaces provide consumers with access to a product search engine. Product search engines may enable consumers to utilize keywords or other phrases to search for a particular item or type of item. For instance, a user might submit a search query including the keywords "winter coat." In response to the query, the search engine may indicate to the consumer one or more product listings for coats or jackets suitable for cold weather. By providing a product search engine accessible to consumers, network-based marketplaces can enable consumers to find multiple products that relate to their search query.

BRIEF DESCRIPTION OF THE DRAWINGS

FIG. 5 illustrates a table indicating measures of similarity between respective search results, according to some embodiments.

FIG. 6 illustrates a table indicating whether measures of similarity between respective search results meet a requisite value, according to some embodiments.

FIG. 13 illustrates a table representing the application of a method for assigning labels to search results, according to some embodiments.

FIG. 15 illustrates a table representing the application of a method for assigning labels to search results, according to some embodiments.

FIG. 17 illustrates a table representing the application of a method for modifying search results, according to some embodiments.

FIG. 20 illustrates a table representing the application of a method for modifying search results, according to some embodiments.

Figure 1:
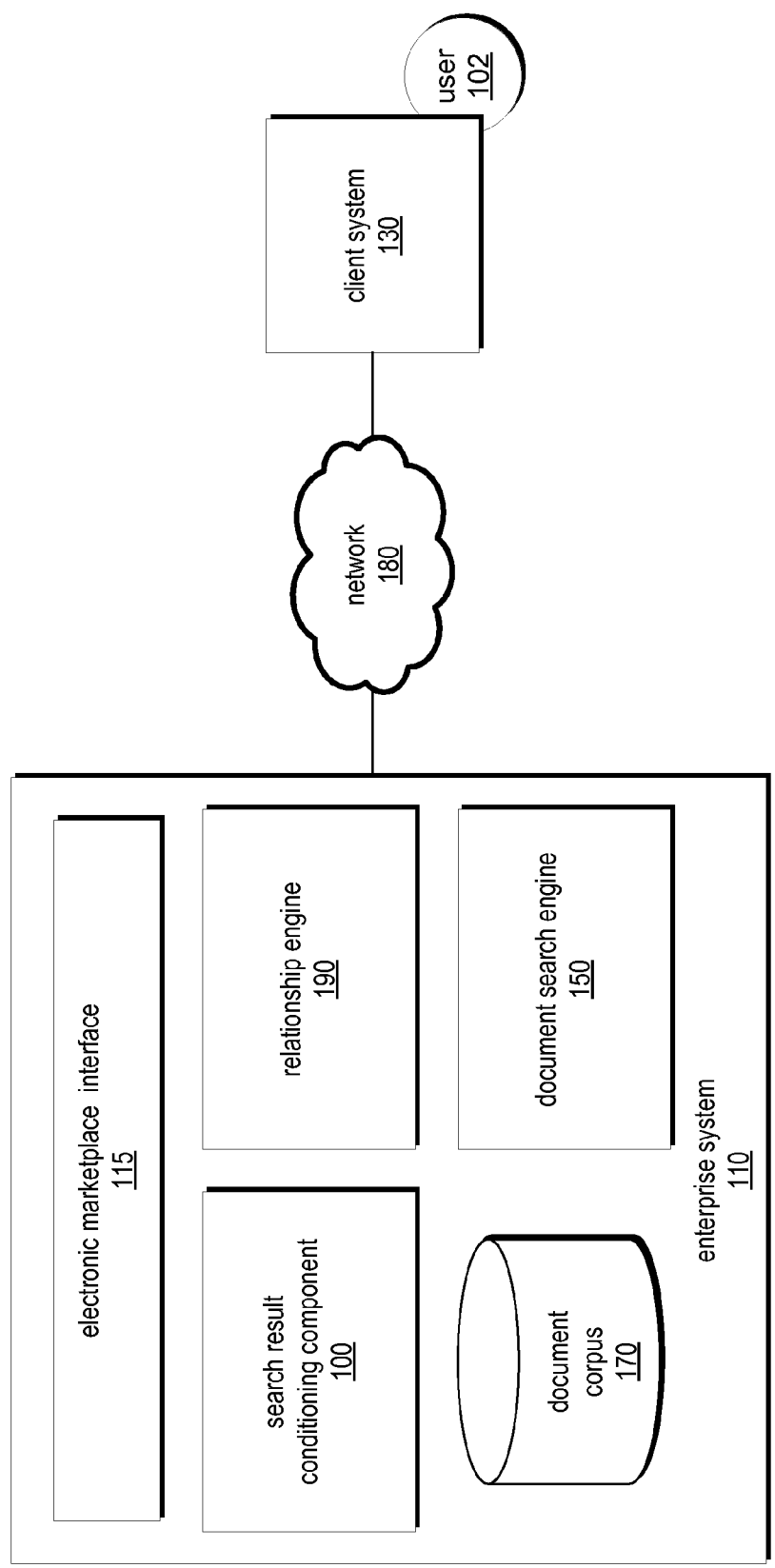
FIG. 1 illustrates a block diagram of an enterprise system including a search result conditioning component, according to some embodiments.

While the system and method for conditioning search results is described herein by way of example for several embodiments and illustrative drawings, those skilled in the art will recognize that the system and method for conditioning search results is not limited to the embodiments or drawings described. It should be understood, that the drawings and detailed description thereto are not intended to limit the system and method for conditioning search results to the particular form disclosed, but on the contrary, the intention is to cover all modifications, equivalents and alternatives falling within the spirit and scope of the system and method for conditioning search results as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for conditioning search results are described. The system and method for conditioning search results may include a search result conditioning component configured to remove (or hide) duplicates or near duplicates from search results. The search result conditioning component may be implemented within an electronic marketplace configured to provide electronic sales listings to consumers. Such sales listings may be provided to consumers in the form of one or more web pages (or other network-based content) that may include, but is not limited to, text, images, audio, video, multimedia and/or other information about an item for sale. In various embodiments, the electronic marketplace may include a web site or other network-based resource for electronic commerce. The electronic marketplace may also provide a search engine that may service search requests for one or more items, such as requests submitted via a consumer's computer system. For instance, a search query submitted to the search engine might include the keywords "flat screen television." In this case, the search engine may respond to such a query with one or more sales listings for flat screen televisions (e.g., a plasma or liquid crystal display television) and possibly related items, such as television cables, home entertainment furniture, accessories, and other items related to flat screen televisions. In various embodiments, the search result conditioning component may be configured to modify search results before such results are ultimately provided to a client (e.g., the consumer's computer system). Modifying the search results may in some cases be referred to herein as "conditioning" the search results. Search results may be conditioned to, e.g., prevent duplicate entries among search results, increase the diversity of search results, and/or modify the search results in some other way.

In various embodiments, electronic marketplaces may generate sales listings for products sold by various merchants. In various cases, the entity controlling the electronic marketplace may offer items for sale through the electronic marketplace. In some cases, the entity controlling the electronic marketplace may enable other entities (e.g., third party merchants) to offer items for sale via the electronic marketplace (in some cases for a fee). In various cases, merchants may provide product information for items sold via the electronic marketplace. In some cases, such information may be incomplete or unstructured. For instance, such information might be missing descriptive information (e.g., size, weight, color, etc.). In some cases, the electronic marketplace may offer an item for sale (e.g., via a website) that may be provided by any of multiple merchants. Since in some cases the sales listings for the same item may differ across merchants (e.g., due to the incomplete or unstructured information described above), an electronic marketplace may, in response to a product search query, provide disparate search results for the same item (or items that are nearly the same). Due to this search characteristic, search results presented to a consumer (e.g., the user of a web- or other network-based browser) may be repetitive or nearly repetitive. The search result conditioning component described herein may be configured to increase the diversity of search results (i.e., reduce the number of duplicate or near duplicate search results) provided to a client that submits a search query.

While various embodiments largely describe search results as search results corresponding to items offered for sale, the search result conditioning component as well as the various methods described herein are not limited to such search results. Indeed, in various embodiments, the search results described herein may include other types of search results that do not necessarily correspond to an item offered for sale. For instance, in some cases, search results may correspond to content sources (e.g., web pages or other network-based content including images, audio, video, etc.). For example, the search results described herein may in some cases by search results of a network-based or web-based search engine that crawls through network content (e.g., web content) to generate a search index.

FIG. 1 illustrates an enterprise system 110 including a search result conditioning component 100. Enterprise system 110 may include an electronic marketplace interface 115, such as a web-based interface accessible via the Internet or some other interface accessible via a network (e.g., network 180). Electronic marketplace interface 115 may be configured to provide its functionality (and/or the functionality of the other components of enterprise system 110) over a network such as network 180. Note that network 180 may include one or more Local Area Networks (LANs) (e.g., corporate or Ethernet networks), Wide Area Networks (e.g., the Internet), other types of electronic networks, and/or some combination thereof. Electronic marketplace interface 115 may be configured to provide its functionality to one or more client systems, such as client system 130. FIG. 1 illustrates a single client system 100 for purposes of clarity. Indeed, in various embodiments any number of client systems may be supported by enterprise system 110.

Electronic marketplace interface 115 may be configured to provide access to an electronic marketplace; the electronic marketplace may include sales listings for a variety of items offered for sale. In various embodiments, such sales listings (or data representing such sales listings) may be stored in a database or other data repository, such as document corpus 170. Such items may be offered for sale by the entity controlling enterprise system 110. In some cases, some of the items offered for sale may be offered for sale by another entity, such as third party merchants. For example, a merchant controlling enterprise system 110 may, for a fee, host sales listings for products sold by other merchants. For instance, such other merchants may have inventory for sale but may not have the necessary infrastructure to support an electronic marketplace of their own. In other cases, the other merchants may provide their own electronic marketplace, but may also utilize the electronic marketplace provided by enterprise system 110 in order to increase exposure of their inventory (e.g., exposure to potential consumers).

Client system 130 may be configured to access the electronic marketplace via a browser application (e.g., Microsoft Internet Explorer, Mozilla Firefox, or another type of web browser) running on the client system. For example, electronic marketplace interface 115 may provide sales listings for various items to client system 130 via one or more accessible hyperlinks or other network-based addresses. Electronic marketplace interface 115 may provide shopping cart and/or checkout functionality such that user 102 may pay for items offered for sale via the electronic marketplace interface. For instance, user 102 may specify items for purchase by adding the items to an electronic shopping cart. Further, the electronic marketplace interface may be configured to process credit card or electronic check payments for such items. The electronic marketplace interface may also be configured to accept other types of payment methods (e.g., money order, check, etc.), whether such methods are currently known or developed in the future.

To facilitate the retrieval of sales listings that are pertinent to a consumer's interests, enterprise system 110 may include a document search engine 150. Document search engine 150 may be configured to, in response to search queries, generate a search result group including one or more search results. A given search result of a search result group may indicate a sales listing associated with the search query; in some cases, a search result may include information for accessing such a sales listing (e.g., a hyperlink or other network address of the sales listing). To submit a search query, a user (e.g., user 102) may specify one or more keywords via client system 130, such as by submitting one or more keywords through a text entry field displayed in a browser application (or any other suitable method of indicating a keyword to enterprise system 110). Document search engine 150 may search document corpus 170 using various search techniques (e.g., indexing, tokenization, etc.) whether such techniques are presently known or developed in the future. For example, document search engine may generate and maintain one or more indices that indicate, for each of one or more keywords, one or more corresponding documents (e.g., sales listings) of document corpus 170. For a particular keyword, a corresponding document may be a document that includes the keyword. For a given search query, document search engine 150 may order the search results of a search result group according to a variety of factors including but not limited to the relevance of the product corresponding to the sales listing that is indicated by the given search result (e.g., a measure of how relevant the product is to the search query), the sales rank of the product corresponding to the sales listing that is indicated by the given search result, the number of views of the sales listing indicated by the given search result (e.g., web page views of the sales listing), and consumer ratings of the product corresponding to the sales listing that is indicated by the given search result.

Figure 2:
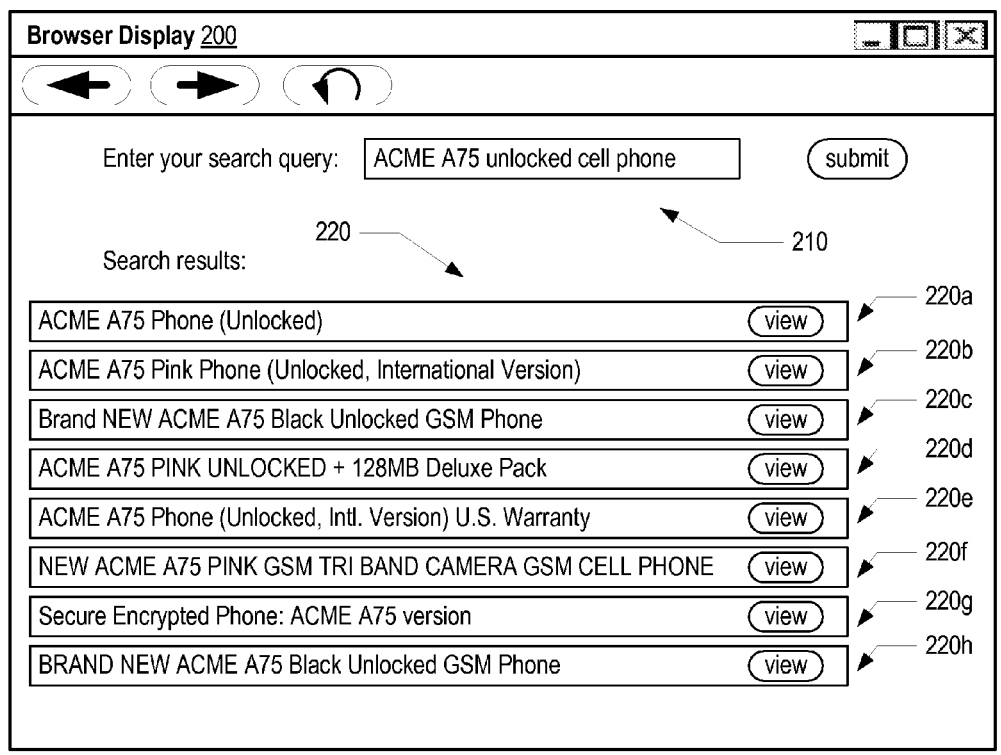
FIG. 2 illustrates an exemplary display of search results, according to some embodiments.

FIG. 2 illustrates an example of a browser display, such as a display of a browser application executing on client system 130. Browser display 200 of FIG. 2 includes search query submission controls 210, which illustrates an example search query including the keywords "ACME A75 unlocked cell phone." Search results 220a-h (which may be referred to collectively as search result group 220) of FIG. 2 illustrate eight example search results that may be provided by document search engine 150 in response to the example search query. Note that in various embodiments, each search result of search result group 220 may represent a hyperlink or other network-based address to which a user (e.g., user 102) may navigate. For instance, user 102 may select (e.g., via mouse or other pointing device) a search result of group 220 in order to view the sales listing for the product (such sales listing may be provided by electronic marketplace interface 115).

In various embodiments, a search result group provided by document search engine 150 may be conditioned before being provided to client system 130. Conditioning of the search results may be performed by search result conditioning component 100 and relationship engine 190. Relationship engine 190 may, for a given document (e.g., a given sales listing) of document corpus 170, generate multiple similarity scores each of which indicate a measure of the similarity between the given document and another document of document corpus 170. For instance, the relationship engine may generate a similarity index that includes a listing of each document of document corpus 170. Additionally, for each (e.g., any or every) listed document, the relationship engine 190 may specify multiple similarity scores (e.g., one similarity score for every other document of the document corpus). Each of such similarity scores may be a similarity score that indicates a measure of the similarity between the listed document and another document of the document corpus 170. For instance, consider the simplified example where document corpus includes three documents: Doc1, Doc2, and Doc3 (note that in various embodiments document corpus 170 may include any number of documents). In this example, for Doc 1, the relationship engine may generate a similarity score between Doc1 and Doc2 and a similarity score between Doc1 and Doc3. For Doc2, relationship engine 190 may generate a similarity score between Doc2 and Doc1 and a similarity score between Doc2 and Doc3. For Doc3, relationship engine 190 may generate a similarity score between Doc3 and Doc1 and Doc3 and Doc2. Note that the generation of a similarity score may in various embodiments be bidirectional for any two given documents. For instance, the similarity score between Doc1 and Doc2 may be the same as the similarity score between Doc2 and Doc1. Accordingly, in some cases, it may only be necessary to generate a similarity score for a particular pair of documents once.

Similarity scores may be represented in a variety of ways. In one embodiment, a similarity score may be represented by a number between 0.00 and 1.00 (e.g., 0.1 might indicate low similarity between two documents and 0.95 might represent high similarity between two documents). Note the scale of 0 to 1 is merely an example. In various cases, any type of similarity scale (e.g., 0 to 100, 1 to 500, −1000 to 1000, etc.) could be employed while remaining within the spirit and scope of various embodiments. In some embodiments, similarity scores may be represented as a binary value (e.g., "yes" or "no"). For instance, a similarity score of "yes" might indicate that two items are indeed similar. Additionally, a similarity score of "no" might indicate that two items are not similar. In various embodiments, such binary similarity scores may be derived from non-binary scores, such as scores of numeric scales (e.g., between 0.00-1.00, 1-5000) or other scales having more than two possible states (e.g., low, medium, high, etc.). For instance, consider the case where the similarity scores generated by relationship engine 190 are represented on a scale of 0.00-1.00, such as the scores 0.05, 0.85, and 0.40. The relationship engine may in various embodiments be configured to apply a similarity threshold to such scores in order to generate the binary forms (e.g., "yes" or "no") of the similarity scores. For example, a similarity threshold 0.8 might be employed by the relationship engine (such threshold may be specified by enterprise system 100 or another entity, such as a system administrator). Applying this threshold to the previously mentioned scores 0.05, 0.85, and 0.40 would result in similarity scores of no, yes, and no, respectively. As can be readily seen from the previous example, scores above the threshold may be converted to "yes" (indicating that two given items are similar) and scores below the threshold may converted to "no" (indicating that two given items are not similar).

Relationship engine 190 may employ various methods and techniques for generating similarity scores. In some embodiments, to generate a similarity score for two documents, the relationship engine may access the documents from document corpus 170 and apply one or more rules to the documents to determine the degree to which the documents are similar. The resulting similarity score may be represented in various forms as described above (e.g., numerical, binary, etc.). Various other techniques may be employed by the relationship engine to generate a similarity score, some of which are described in commonly owned and co-pending U.S. patent application Ser. No. 11/754,241, filed May 25, 2007, entitled Generating Similarity Scores for Matching Non-Identical Character Strings, which is herein incorporated by reference in its entirety, and U.S. patent application Ser. No. 11/953,726, filed Dec. 10, 2007, entitled Comparison Engine for Identifying Documents Describing Similar Subject Matter, which is herein incorporated by reference in its entirety.

As described above, document search engine 150 may provide results of a document search initiated by a search query, such as a query received from client system 130. In many embodiments, these search results may be conditioned by search result conditioning component 100 before the search results are provided to client system 130. In general, the manner in which the search result conditioning component conditions the search results increases the diversity of the search results. For example, one way in which the diversity of search results may be increased includes the search result conditioning component identifying a class (i.e., a subgroup) of highly similar documents (e.g., sales listings) within the search result group provided by the document search engine. Additionally, from each identified class, a representative member may be chosen (based on one or more criteria) by the search result conditioning component. In some embodiments, for each identified class of search results, each search result that is not the representative member is removed from the search result group. In various embodiments, this search result group (i.e., the conditioned search result group) is provided to the electronic marketplace interface, which then provides the conditioned search result group to client system 130, as described in more detail below.

Figure 3:
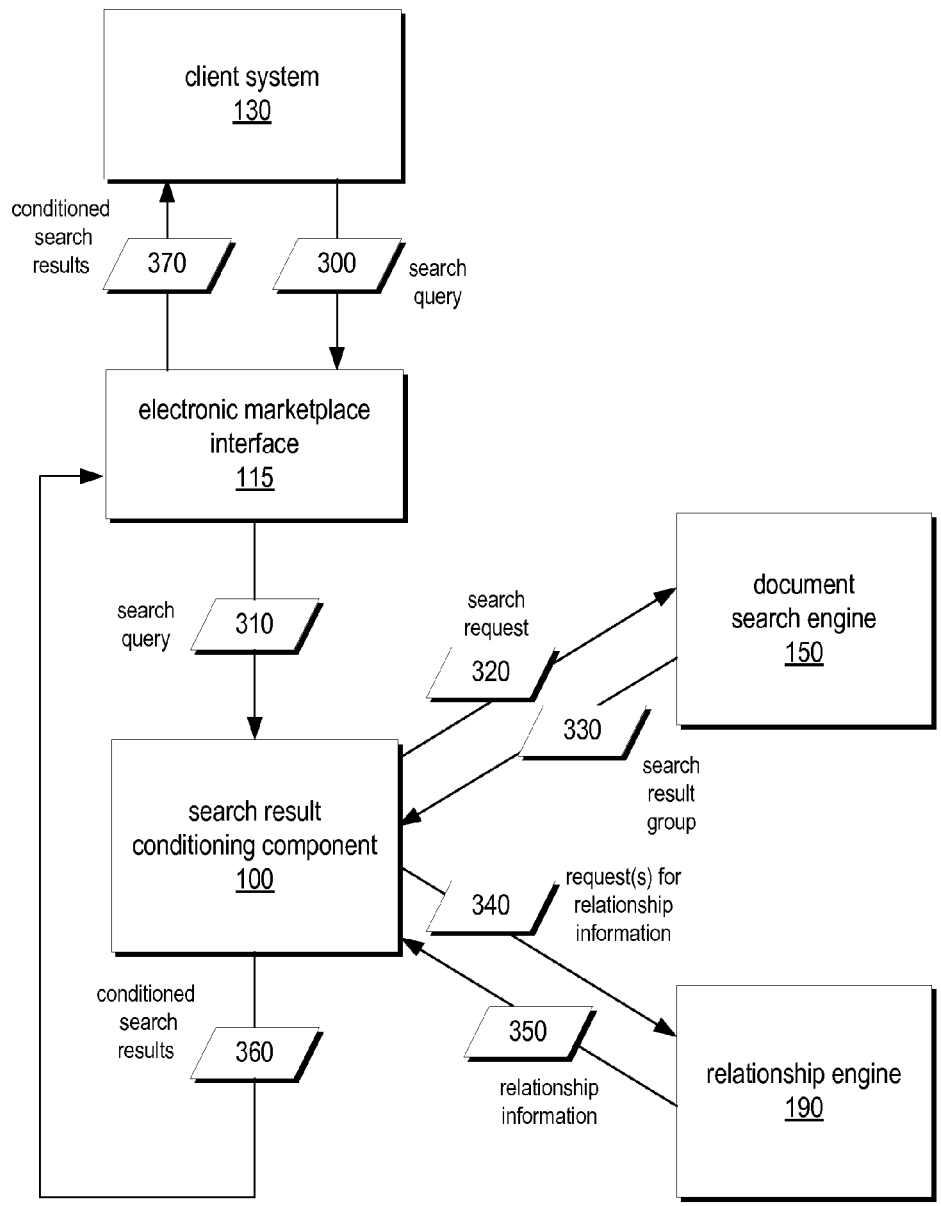
FIG. 3 illustrates a data flow diagram illustrating the processing of a search query received from a client system, according to some embodiments.

FIG. 3 illustrates a data flow diagram for the processing of a search query, according to some embodiments. More specifically, the illustrated data flow diagram demonstrates one example of a technique for providing conditioned search results in response to a search query. As illustrated by search query 300, client system 130 may submit a search query to electronic marketplace interface 115. For instance, as described above, a user (e.g., user 102) may utilize an application of client system 130 (e.g., a web browser) to submit a search query to electronic marketplace interface 115. One example of a search query is illustrated by FIG. 2 as described above (e.g., "ACME A75 unlocked cell phone"). The electronic marketplace interface 115 may provide the search query to search result conditioning component 100, as illustrated by search query 310. In some embodiments, data representing the search query may be modified by electronic marketplace 115 before the search query is provided to the search result conditioning component. For instance, the electronic marketplace interface 115 may format search query 310 as a remote procedure call (RPC), application programming interface (API) call, and/or a web service call. In various embodiments, any of the other requests of FIG. 3 may also be implemented in this manner.

Figure 4:
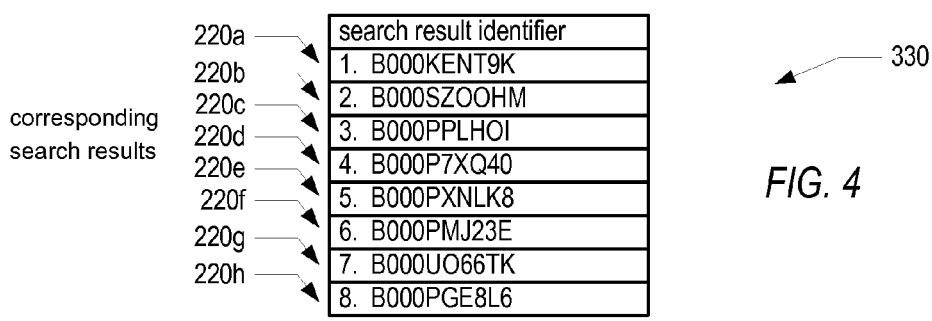
FIG. 4 illustrates a table of search results generated by a document search engine, according to some embodiments.

Search result conditioning component 100 may submit a search request 320 to document search engine 150. Such search request may include the keyword(s) of the search query submitted by client system 130. In one example, the search result conditioning component might submit the keywords "ACME A75 unlocked cell phone" to the document search engine. Document search engine 150 may return a search result group that includes one or more search results to the search result conditioning component. Each of such search results may indicate a document (e.g., a sales listing) of document corpus 170 that matches or corresponds to the search query. For instance, each of such search results may indicate a network-based addressed (e.g., a hyperlink) of a respective document or another identifier for the respective document. A visual example a search result group is illustrated by search result group 220 of FIG. 2. Additionally, FIG. 4 illustrates a corresponding example of search result group 330. As illustrated by FIG. 4, the exemplary search result group indicates document identifiers (or sales listing identifiers) for each of the search results illustrated in FIG. 2. Note that the format of the identifiers is merely exemplary. Indeed, in other embodiments, other formats are possible and contemplated. In general, search result group 330 may include any indication of one or more documents that are results to the given search query. As described above, for a given search query, document search engine 150 may order the search results of a search result group according to a variety of factors including but not limited to the relevance of the product corresponding to the sales listing that is indicated by the given search result (e.g., a measure of how relevant the product is to the search query), the sales rank of the product corresponding to the sales listing that is indicated by the given search result, the number of views of the sales listing indicated by the given search result (e.g., web page views of the sales listing), and consumer ratings of the product corresponding to the sales listing that is indicated by the given search result. Such ordering may be referred to herein as search result priority. In the illustrated embodiment of FIG. 4, the eight search results are listed in descending order of priority (as indicated by the numbers 1-8).

As indicated by request 340, search result conditioning component 100 may submit one or more requests for relationship information to relationship engine 190. In some embodiments, search result conditioning component 100 may submit a request for relationship information for each search result of search result group 330. In other embodiments, search result conditioning component may submit a single request for all relationship information pertaining to search result group 330. In some embodiments, a request for relationship information may include, for a given search result of search result group 330, a request for similarity scores that indicate a measure of similarity between the given search result and each other search result of search result group 330, such as the similarity scores described above. In other cases, a request for relationship information may include, for a given search result of search result group 330, a request for a listing of the other search results of search result group 330 to which the given search result is related.

In response to request 340, relationship engine 190 may return relationship information 350 to the search result conditioning component. In various embodiments, this information may include relationship information for each search result of search result group 330. In various embodiments, such relationship information may include the similarity scores described above. FIG. 5 illustrates an example of relationship information 350 represented as a matrix. The illustrated matrix denotes, for a given search result, a similarity score for every other search result of the search result group; a given similarity score indicates a measure of similarity between the given search result and an other search result. For example, in the illustrated embodiment, the similarity score between the search results (i.e., documents or sales listings) identified by B000SZOOHM and B000KENT9K is 0.25.

As described above, similarity scores may also be expressed in binary form. For example, the relationship engine may specify, for any given search result pair, whether the pair are similar (e.g., by indicating "yes" or "no", or some equivalent thereof). The matrix of FIG. 6 illustrates one example of such a representation. The illustrated matrix denotes, for a given search result, whether the other search results of the search result group are related to the given search result (e.g., "yes" for similar, "no" for not similar). In some embodiments, relationship engine 190 may generate the data represented by the matrix of FIG. 6 by applying a threshold to the data represented by the matrix of FIG. 5. In one example, relationship engine 190 may generate the data represented in FIG. 6 by applying a threshold of "0.8" to the data of FIG. 5. In other words, for a given search result pair having a similarity score equal to or greater than 0.8, the relationship engine may indicate that such search result pair is indeed similar. Likewise, for a given search result pair having a similarity score that is less than 0.8, the relationship engine may indicate that such search result pair is not similar (or not similar enough to be considered similar). While the data of FIG. 6 is based on the application of a 0.8 threshold to the data of FIG. 5, other thresholds (e.g., such as a threshold specified by the relationship engine, the search result conditioning component, some other component, or a system administrator) may be employed. In some cases, a data structure representing the matrix of FIG. 6 may omit information indicating that two given search results have a similarity score below the above-described threshold (i.e., the "no" relationships). Such a data structure may be employed for various reasons including but not limited to the conservation of data storage space (e.g., storing only the "yes" relationships of FIG. 6 may require less data storage space than the data storage space required to store both "yes" and "no" relationships) and to ensure the clarity or relevance of the data (e.g., in some embodiments, the analyses and methods for search result conditioning may not require knowledge of information indicating that two given search results have a similarity score below the above-described threshold).

Figure 7:
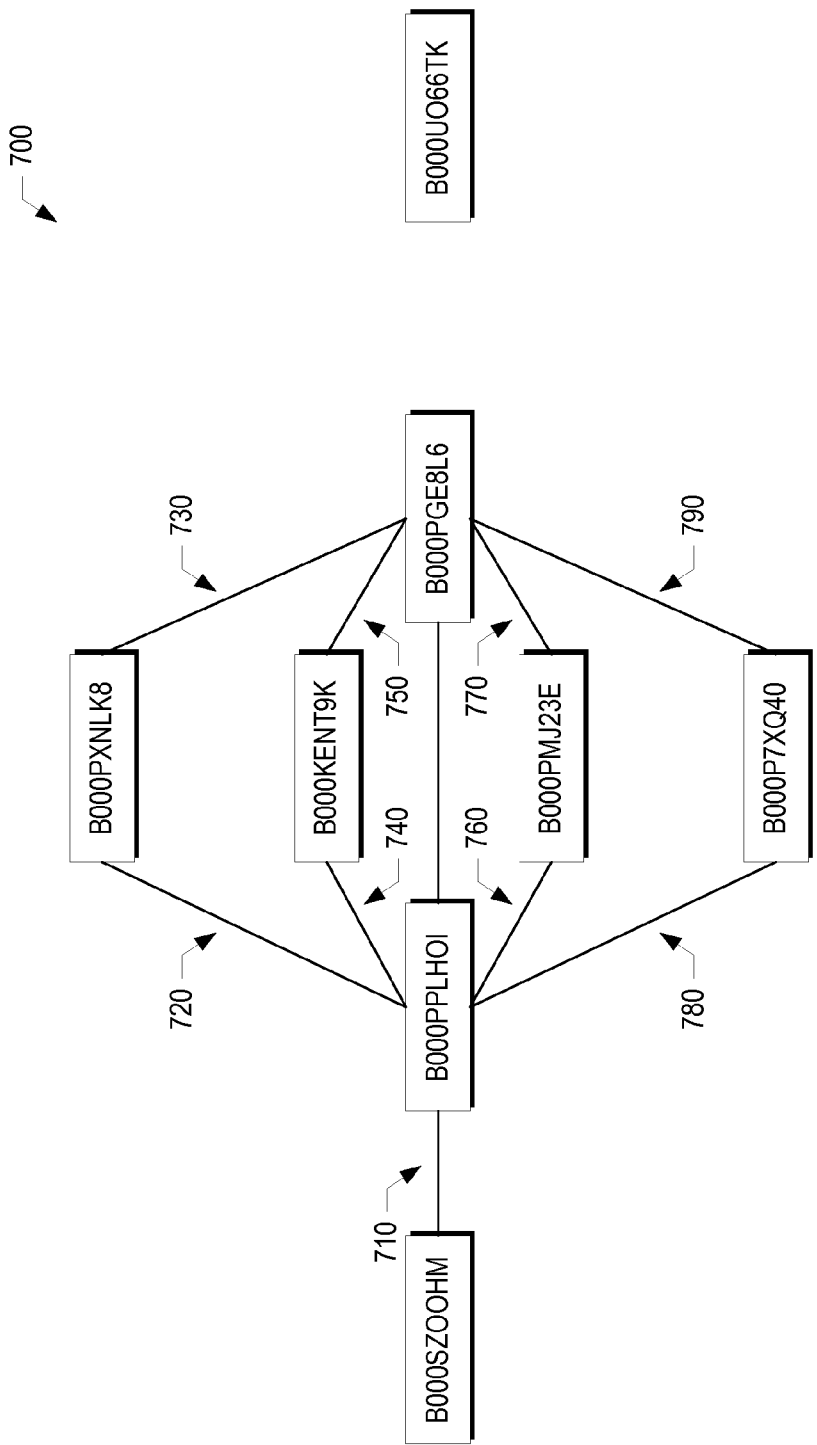
FIG. 7 illustrates a graph indicating requisite measures of similarity between respective pairs of search results, according to some embodiments.

FIG. 7 illustrates a graphical representation of the data represented by FIG. 6. Graph 700 of FIG. 7 is a representation of search result group 330. The graph illustrates a representation of each search result of the search result group; each search result may be referred to herein as a "node" of the graph. For example, removing a node from the graph may be considered equivalent to removing a search result from the search result group. The graph also indicates, for a given search result, each other search result to which the given search result is similar. More specifically, edges 710-790 illustrate such similarities by connecting search results that are indicated as similar by the relationship engine (or by the search result conditioning component). For instance, edge 710 indicates that the search result identified by "B000SZOOHM" is similar to the search result identified by "B000PPLHOI," edge 750 indicates that the search result identified by "B000PGE8L6" is similar to the search result identified by "B000KENT9K." Note that in various embodiments each edge of FIG. 7 may correspond to an indication of "yes" as represented in the matrix of FIG. 6. Also note that in various embodiments, the graph of FIG. 7 and the matrices of FIGS. 5-6 may but need not be generated by relationship engine 190 and/or search result conditioning component 100. In some embodiments, the information represented by graph 700 and/or the matrices may be stored as any suitable data structure. In some embodiments, the information illustrated may be a record that includes a list of search results of search result group 330 and, for each given search result, a list of the other search results to which the given search result is similar.

As described above, document corpus 170 may include sales listings that may be presented to client systems (e.g., client system 130) as well as various consumers (e.g., user 102). Note that the similarity scores described herein may in some cases be a measure of the likelihood that two sales listings represent the same item or product offered for sale. If two sales listings represent the same item, the sales listings may be considered duplicates (even though the sales listings themselves may in some cases differ to some extent). For example, two sales listings A and B with a similarity score of 0.9 are more likely to be duplicates than two other sales listings C and D that have a similarity score of 0.85. By adjusting the threshold described above, the relationship engine (and/or the search result conditioning component) may alter the structure of the matrix of FIG. 6 and the graph of FIG. 7. Consider the previous example of sales listings A and B and sales listings C and D. If the relationship engine (and/or the search result conditioning component) applies a threshold of 0.8 to the similarity scores of sales listings A and B and sales listings C and D, A and B would be indicated as duplicates by the relationship engine (and/or the search result conditioning component). Additionally, C and D would be considered duplicates by the relationship engine (and/or the search result conditioning component). However, had a threshold of 0.87 been employed, sales listings A and B would be indicated as duplicates by the relationship engine (and/or the search result conditioning component) whereas sales listings C and D would not be indicated as duplicates. In a similar manner, a threshold of 0.92 would result in neither pair of sales listings being indicated as duplicates by the relationship engine (and/or the search result conditioning component).

Referring again to FIG. 3, search result conditioning component 100 may be configured to use relationship information 350 to "condition" or modify the search result group before providing the search result group to the electronic marketplace interface 115 and subsequently to client system 130. Search result conditioning component 100 may modify the search results by removing (or "hiding," as described in more detail below) search results from the search result group. Various methods may be employed by the search result conditioning component to modify or prune the search result group 330 before subsequently providing such search result group to electronic marketplace interface 115 and client system 130. Examples of such methods are described below.

Edge Cover Method

Figure 8:
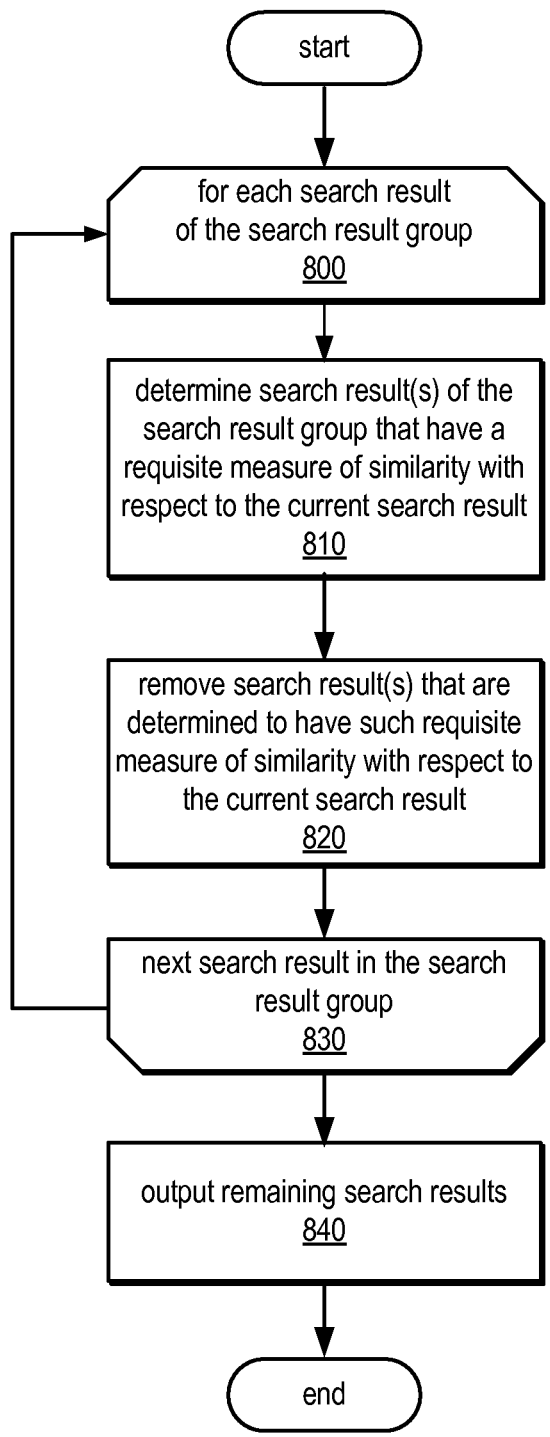
FIG. 8 illustrates a flowchart representing a method for modifying search results, according to some embodiments.

One method of modifying search results, such as search results provided by the document search engine, includes an "edge cover method," which is illustrated by the flowchart of FIG. 8. As illustrated by block 800, the method may include evaluating each of the search results with the techniques described below with respect to blocks 810 and 820. In various embodiments, each search result may be evaluated in order of priority. For instance, the search results illustrated in FIG. 4 may be evaluated in order from highest priority (search result 220a) to lowest priority (search result 220h).

As illustrated by block 810 the method may include determining search result(s) of the search result group that have a requisite measure of similarity with respect to the search result currently being evaluated. In various embodiments, such requisite measure of similarity may be a similarity score equal to or greater than a particular value. One example of such value includes the similarity score threshold described above. For instance, in some embodiments, the method may include determining whether the similarity score between the current search result and another search result meets a particular similarity score threshold. Note the table of FIG. 6 and the graph of FIG. 7 indicate, for a given search result, which search results have a requisite measure of similarity with respect to the given search result. In FIG. 6, such indication is provided by a "yes" entry. In FIG. 7, such indication is provided by the presence of an edge between a given node and another node. In these cases, an exemplary threshold of 0.8 has been utilized; however, any other suitable threshold may be employed in other cases.

As illustrated by block 820, the method may include removing from the search result group the search results that are determined to have a requisite measure of similarity with respect to the current search result. For instance, for a given search result being evaluated, the method may include removing the search results to which the given search result is connected by an edge, as illustrated in FIG. 7. In another example, the method may include removing the search results to which the given search result is similar as indicated by the table of FIG. 6. As indicated by block 830, the method may include repeating the elements of the method described with respect to blocks 810 and 820 for each search result of the search result group. As described in more detail below with respect to the section entitled "Measures of Similarity—Different Degrees of Similarity," measures of similarity may have various degrees.

Once each search result has been evaluated, the remaining search results may be outputted as a modified search result group. For instance, such modified search result group may include the conditioned search results 360 of FIG. 3.

Edge Cover Method—An Example

Figure 9:
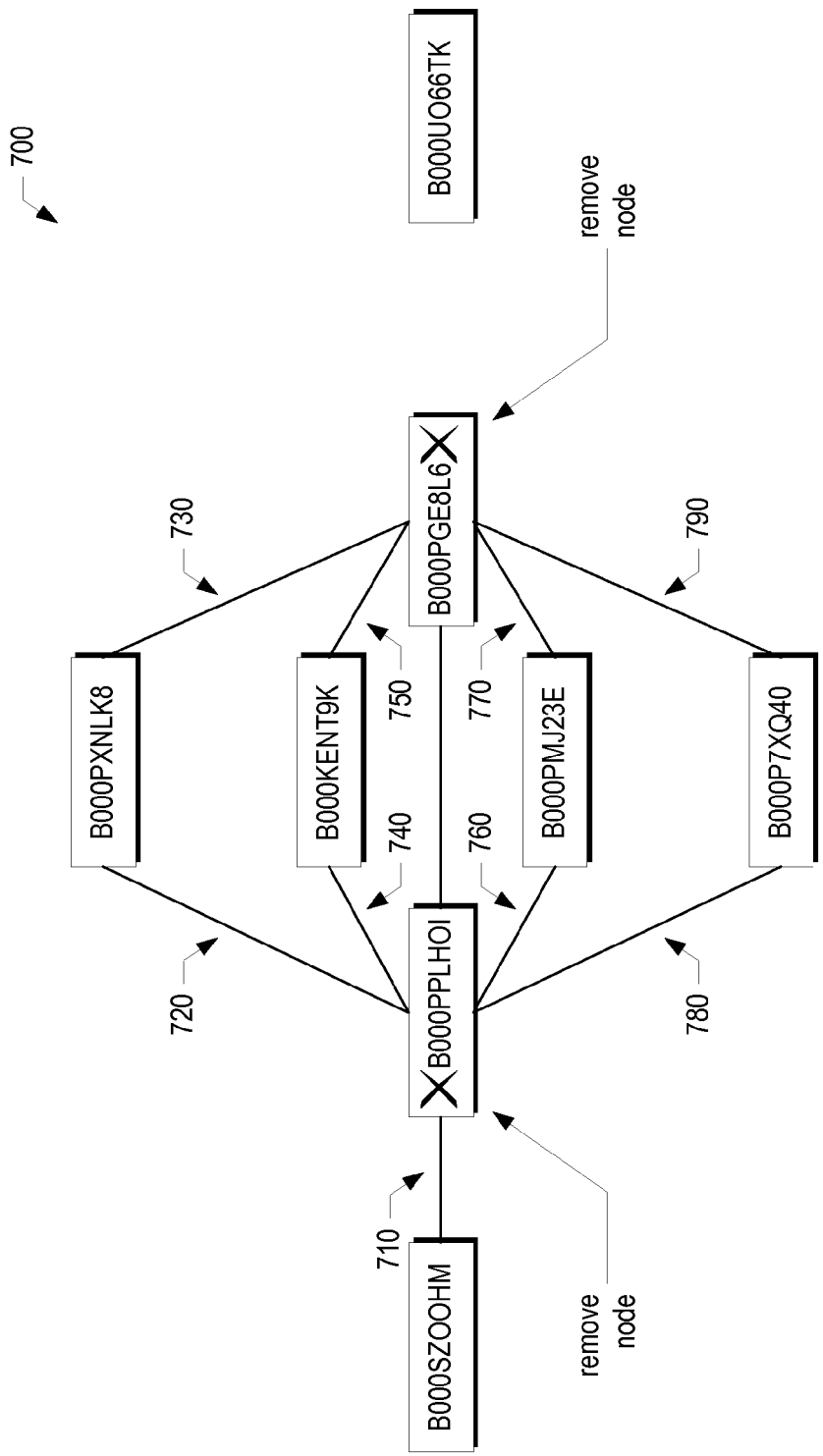
FIG. 9 illustrates a graph indicating requisite measures of similarity between respective pairs of search results, according to some embodiments.

An example of the edge cover method may be described with respect to the graph of FIG. 9. FIG. 9 includes graph 700 described above with respect to FIG. 7. In accordance with block 800 of FIG. 8, the example may include evaluating the first search result of the graph. As described above, the first search result may be the search result having the highest priority. As illustrated by FIG. 4, the search result having the highest priority is B000KENT9K. In accordance with block 810, the example may include determining the search results that are connected to B000KENT9K by an edge. In the illustrated graph, B000PPLHOI is connected to B000KENT9K by edge 740 and B000PGE8L6 is connected to B000KENT9K by edge 750. In accordance with block 820, the example may include removing both B000PPLHOI and B000PGE8L6 from the search result group. In accordance with block 830, the above techniques may be repeated for each of the other search results (e.g., in order of priority). In this example, the next search result to evaluate is B000SZOOHM. Applying the techniques of blocks 810 and 820 for B000SZOOHM may result in the removal of B000PPLHOI. However, in this case, B000PPLHOI has already been removed. Accordingly, it is not necessary to remove B000PPLHOI again. By repeating the techniques of blocks 810 and 820 for the remaining nodes in the graph, all nodes except B000PPLHOI and B000PGE8L6 will remain for this example. In accordance with block 840, the search results that have not been removed may be outputted (see e.g., FIG. 10 described below).

Figure 10:
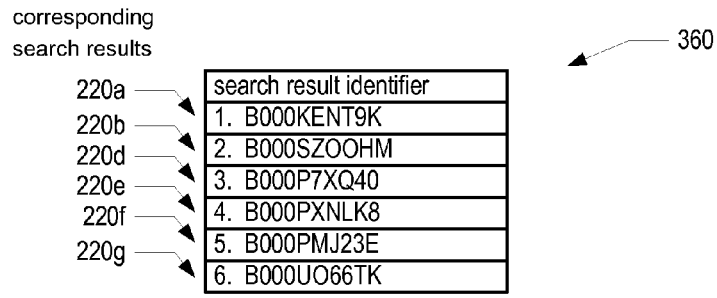
FIG. 10 illustrates a table of search results generated by a search result conditioning component, according to some embodiments.
Figure 11:
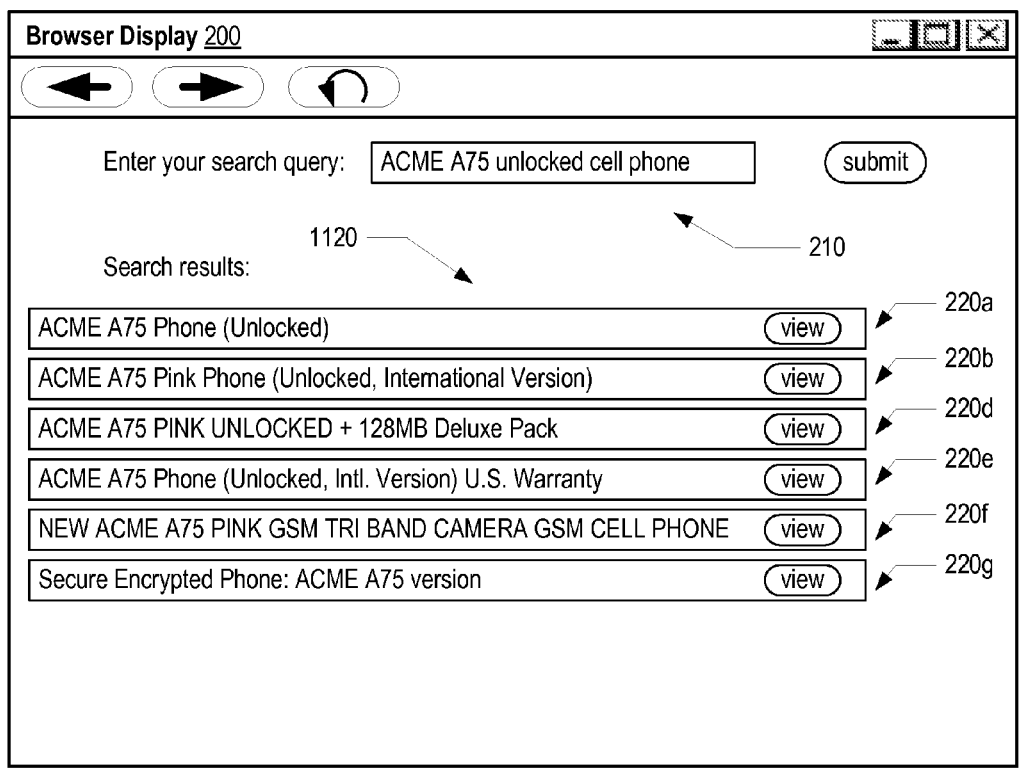
FIG. 11 illustrates an exemplary display of search results, according to some embodiments.

One example of search results modified by the edge cover method is illustrated by FIG. 10. Note that FIG. 10 illustrates conditioned search results 360 after B000PPLHOI and B000PGE8L6 have been removed in accordance with the edge cover method example described above. Conditioned search results 360 of FIG. 10 may illustrate one example of search results provided by the search result conditioning component to electronic marketplace interface 115, as illustrated in FIG. 3. Electronic marketplace interface 115 may provide the conditioned search results 115 to client system 130. In turn, client system 130 may display conditioned search results 1120 to a user (e.g., user 102), as illustrated by the browser display of FIG. 11.

Label Cover Method—Labeling Search Results Based on Lexicographical Sorting

One method of modifying search results, such as search results provided by the document search engine, includes a "label cover method," which is described in more detail below with respect to FIG. 16. To perform the label cover method, each search result of a search result group (e.g., search result group 330) may first be labeled using various methods. One method for labeling search results is described herein with respect to FIG. 12. As illustrated by block 1200, the method may include evaluating each of the search results with the techniques described below with respect to blocks 1210-1230. In various embodiments, each search result may be evaluated in order of priority. For instance, the search results illustrated in FIG. 4 may be evaluated in order from highest priority (search result 220a) to lowest priority (search result 220h).

As illustrated by block 1210, the method may include determining the search result(s) of the search result group (e.g., search result group 330) that have a requisite measure of similarity with respect to the current search result being evaluated. In various embodiments, such requisite measure of similarity may be a similarity score equal to or greater than a particular value. One example of such value includes the similarity score threshold described above. For instance, in some embodiments, the method may include determining whether the similarity score between the current search result and another search result meets a particular similarity score threshold. Note the table of FIG. 6 and the graph of FIG. 7 indicate, for a given search result, which search results have a requisite measure of similarity with the given search result. In FIG. 6, such indication is provided by a "yes" entry. In FIG. 7, such indication is provided by the presence of an edge between a given node and another node. In these cases, an exemplary threshold of 0.8 has been utilized; however, any other suitable threshold may be employed in other cases.

As illustrated by block 1220, the method may also include lexicographically sorting the current search result being evaluated and the search results that have been determined to have a requisite measure of similarity with respect to the current search result. For example, each of such search results may be lexicographically sorted according to its respective identifier. As indicated by block 1230, the method may also include labeling the current search result with the identifier of the search result appearing earliest in the lexicographical sort. As indicated by block 1240, the portion of the method described with respect to block 1210-1230 is repeated for each search result of the search result group.

Figure 12:
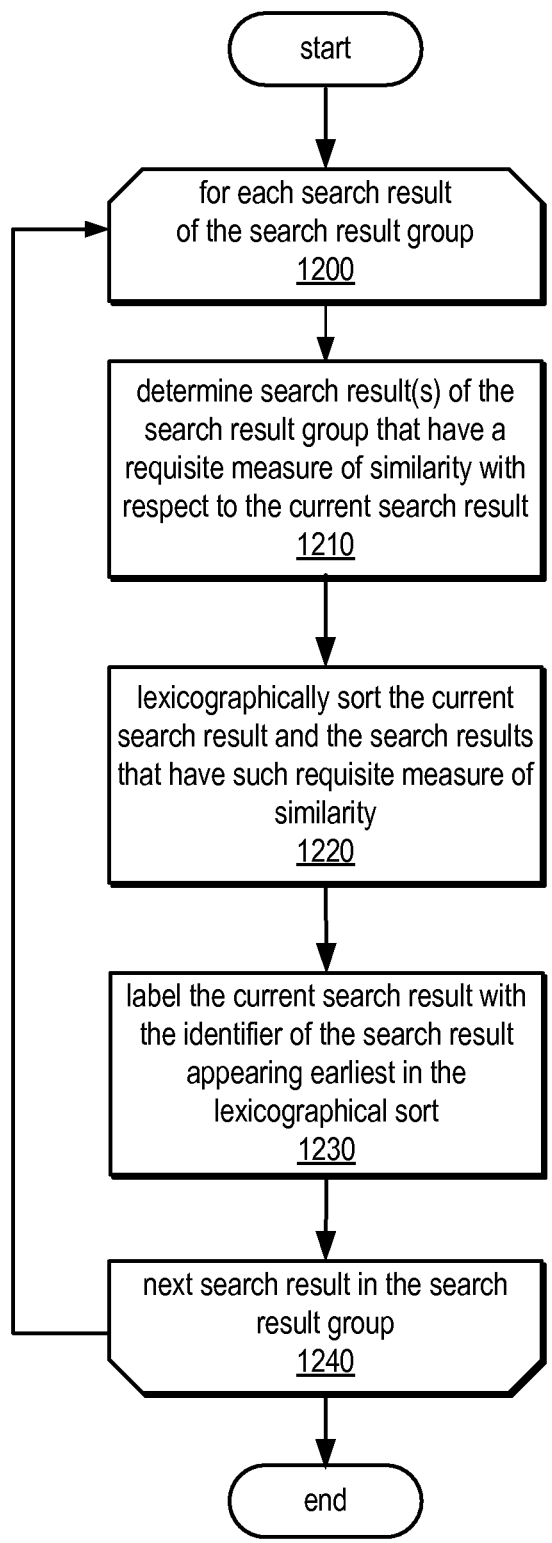
FIG. 12 illustrates a flowchart representing a method for assigning labels to search results, according to some embodiments.

Label Cover Method—Labeling Search Results Based on Lexicographical Sorting—An Example The table of FIG. 13 illustrates an example of the application of the method illustrated in FIG. 12 to a search result group, such as search result group 330 (illustrated at column 1300, rows 1340-1375). In accordance with block 1210 of FIG. 12, the example may include determining the search result(s) of the search result group that have a requisite measure of similarity with respect to the search result of column 1300, row 1340 (B000KENT9K). In this example, the information represented by the table of FIG. 6 or the graph of FIG. 7 may be used to determine the search results having a requisite measure of similarity with respect to the search result identified by B000KENT9K. As illustrated by row 1340 of column 1310, such search results are identified by B000PPLHOI and B000PGE8L6. In accordance with block 1220 of FIG. 12, the example may include lexicographically sorting the search result (B000KENT9K) and the search results (B000PPLHOI, B000PGE8L6) having a requisite measure of similarity with respect to the search result. As illustrated by row 1340, column 1320, lexicographically sorting such search results yields: B000KENT9K, B000PGE8L6, B000PPLHOI. In accordance with block 1230, the example may include assigning a label to the search result being evaluated; such label may include the identifier of the search result appearing earliest in the lexicographical sort. As indicated by column 1320 of row 1340, B000KENT9K is the identifier appearing first in the lexicographical sort. Accordingly, B000KENT9K is the label assigned to the search result identified by B00KENT9K, as indicated by column 1330 of row 1340. In this example, similar techniques are applied to each row of the table to determine the additional labels of column 1330.

Label Cover Method—Labeling Search Results Based on Degree Sorting

Figure 14:
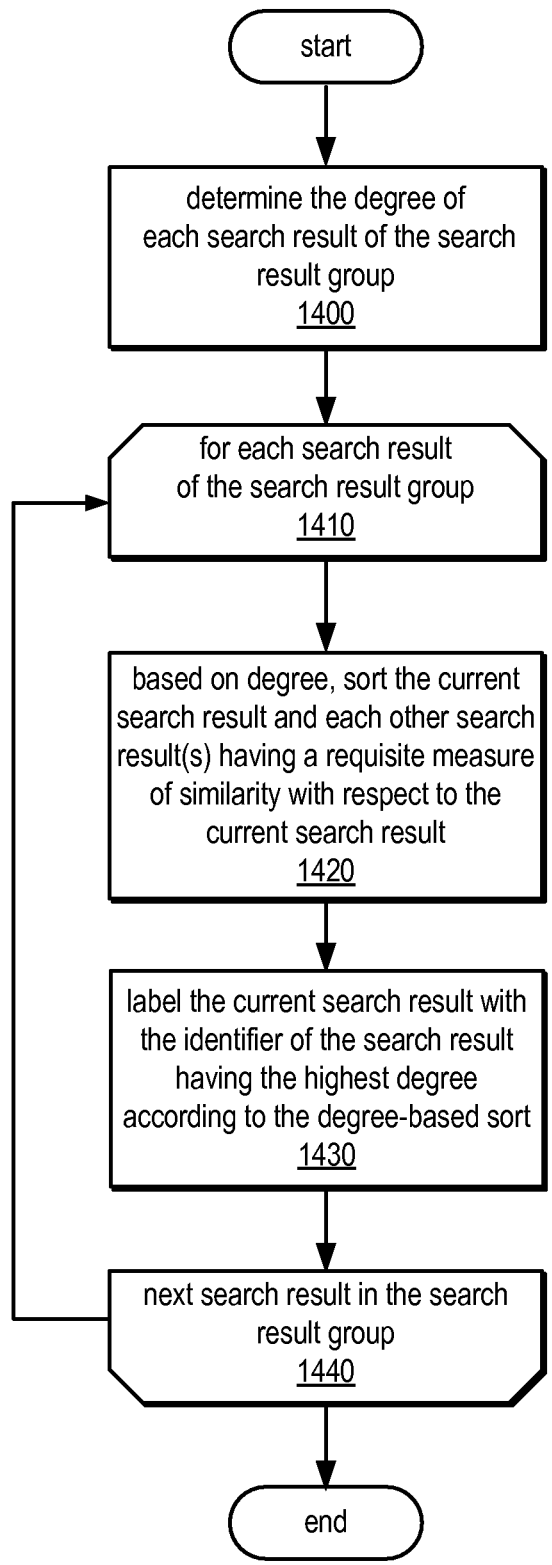
FIG. 14 illustrates a flowchart representing a method for assigning labels to search results, according to some embodiments.

FIG. 14 illustrates an alternative method for labeling search results of a search result group, according to some embodiments. As is the case with the lexicographical sorting method described above, the degree sorting method may be utilized to label search results of a search result group (e.g., search result group 330) before performing the label cover method to modify the search result group, which is described in more detail below. As illustrated by block 1400, the method may include determining the degree of each search result of the search result group. In various embodiments, the degree of a given search result may include the number or quantity of other search results (of the search result group) that have a requisite measure of similarity with respect to the given search result. As described above, in various embodiments, such requisite measure of similarity may be a similarity score equal to or greater than a particular value. One example of such value includes the similarity score threshold described above. For instance, in some embodiments, the method may include determining whether the similarity score between the current search result and another search result meets a particular similarity score threshold. Note the table of FIG. 6 and the graph of FIG. 7 indicate, for a given search result, which search results have a requisite measure of similarity with the given search result. In FIG. 6, such indication is provided by a "yes" entry. In FIG. 7, such indication is provided by the presence of an edge between a given node and another node. For example, the search result identified by B000PPLHOI may have a degree of 6 since it has 6 edges between itself and other search results (see e.g., FIG. 7).

As indicated by block 1410, the portions of the method described with respect to block 1420 and 1430 may be repeated for each search result of the search result group. For a given search result, the method may include sorting, based on degree, the current search result and each other search result (of the search result group) having a requisite measure of similarity with respect to the current search result (block 1420). As indicated by block 1430, once sorted, the method may include labeling the current search result with the identifier of the search result having the highest degree (according to the sort performed with respect to block 1420). As indicated by block 1440, blocks 1420 and 1430 may be repeated for each search result of the search result group.

Label Cover Method—Labeling Search Results Based on Degree Sorting—an Example

The table of FIG. 15 illustrates an example of the application of the method illustrated in FIG. 14 to a search result group, such as search result group 330 (illustrated at column 1500, rows 1540-1575). In accordance with block 1400 of FIG. 14, the example may include determining the degree of each search result. For example, each of rows 1540-1575 of column 1510 may represent the degree of the corresponding search result. In some embodiments, this degree may represent the number of edges to which the search result is coupled as illustrated in the graph of FIG. 7. In accordance with block 1420, for a given search result, the example may include performing a degree-based sort on the given search result and other search results having a requisite measure of similarity with respect to the given search result. For instance, consider the given search result identified by B000KENT9K. In the illustrated example, the search results identified by B000PPLHOI and B000PGE8L6 have a requisite degree of similarity with respect to the given search result. For instance, as indicated by the graph of FIG. 7, edges couple B000KENT9K and B000PPLHOI as well as B000KENT9K and B000PGE8L6. As indicated by column 1510, B000KENT9K has a degree of 2, B000PPLHOI has a degree of 6, and B000PGE8L6 has a degree of 5. Accordingly, column 1520 of row 1540 illustrates each of such search results sorted by degree, with B000PPLHOI being the search result having the highest degree. Accordingly, column 1530 of row 1540 indicates that the label assigned to the given search result (B000KENT9K) is B000PPLHOI. In a similar manner, the method of FIG. 14 may be applied to each row of the table to generate the illustrated results.

Label Cover Method

After labels have been generated for the search results of the search result group, such as described above with respect to the lexicographical- and degree-based labeling techniques, the label cover method may be performed as described herein. Note that in various embodiments, the generation of labels may be performed offline (e.g., in some cases well before the application of the label cover method). For instance, labels may be generated and stored in a data store; the search result conditioning component may access such labels from the data store. Alternatively, in some cases, labels may be generated by the search result conditioning component while performing the label cover method (e.g., in real-time or on-the-fly). Note that in some embodiments, other components may be tasked with generating labels for the label cover method; the search result conditioning component may utilize such labels for the label cover method described herein.

Figure 16:
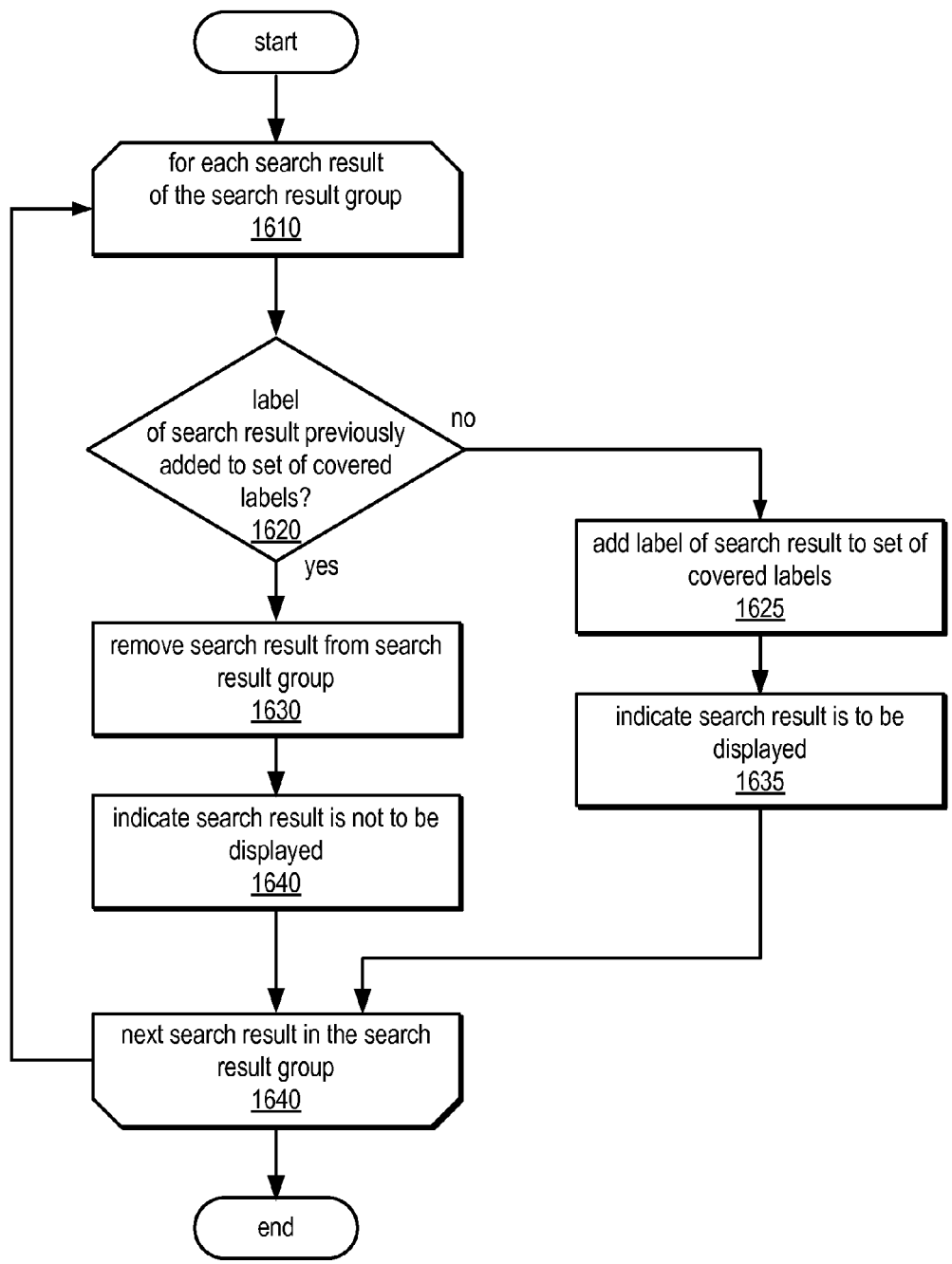
FIG. 16 illustrates a flowchart representing a method for modifying search results, according to some embodiments.

FIG. 16 illustrates one example of a label cover method for modifying a search result group (e.g., search result group 330) before such search result is provided to an electronic marketplace interface and/or a client system. As illustrated by block 1610, the method includes performing the method for each of the search results within the search result group. As is the case with the edge cover method described above, the search results of the search result group may be evaluated in order of priority. For instance, the search results illustrated in FIG. 4 may be evaluated in order from highest priority (search result 220*a*) to lowest priority (search result 220*h*).

As illustrated by block 1620, the method may include determining whether the label of the current search result has been previously added to a set of covered labels. Such set of covered labels may be a record generated or managed by the search result conditioning component described herein. As indicated by the negative output of block 1620, if the label of the current search result has not been previously added to the set of covered labels, the method may include adding the label of the current search result to the set of covered labels (block 1615). If the label of the current search result has not been previous added to the set of covered labels, the method may also (or alternatively) include indicating that the search result is to be displayed as a search result. For instance, the method may include indicating that the current search result is to be displayed in a listing of search results provided to client system 130. As indicated by the positive output of block 1620, if the label of the current search result has been previously added to the set of covered labels, the method may include removing the search result from the search result group (block 1630) and/or indicating that the search result is not to be displayed as a search result (block 1640). For instance, the method may include indicating that the current search result is not to be displayed in a listing of search results provided to client system 130. As indicated by block 1640, the method may be repeated for each of the search results of the search result group (e.g., search result group 330).

Label Cover Method—An Example

The label cover example described herein may be performed in conjunction with any method of labeling search results, such as the lexicographical sorting and degree sorting methods described above. In other cases, other methods of labeling search results may be employed, whether such methods are currently known or developed in the future. In the illustrated example (FIG. 17), the labels derived using the lexicographical sorting method will be utilized to illustrate the label cover method. Note that the use of such labels is merely exemplary; in other cases, other labels (such as those derived from the degree sorting method or some other labeling method) may be utilized. In accordance with block 1610, the label cover method may be applied to each search result of the search result group, as illustrated by the search results of column 1700 of rows 1740-1775. In accordance with block 1620, the illustrated example may include determining whether the label (B000KENT9K; row 1740, column 1710) of the first search result (B000KENT9K; row 1740, column 1700) has been previously added to the set of covered labels. Since this is the first iteration of the method in this example, no labels may have been previously added to the set of covered labels. Accordingly, the example may include adding the search result identifier's label (B000KENT9K; column 1710 of row 1740) to the set of covered labels as indicated at column 1720 of row 1740 (in accordance with block 1625 of FIG. 16). In accordance with block 1635 of FIG. 16, the example may also include indicating that the search result is to be displayed (column 1730 of row 1740) (e.g., displayed on client system 130).

In accordance with block 1640, the example may evaluate the next search result (B000SZOOHM) in the search result group. In accordance with block 1620, the illustrated example may include determining whether the search result label (B000PPLHOI; column 1710 of row 1745) was previously added to the set of covered labels (column 1720 of row 1740). In the illustrated case, the label has not been previously added to the set of covered labels (e.g., B000PPLHOI is not a member of set indicated at column 1720 of row 1740). Accordingly, the example may include adding the label to the set of covered labels (as indicated at column 1720 of row 1745) (in accordance with block 1625 of FIG. 16). The example may also include indicating the search result is to be displayed (column 1730 of row 1745) (e.g., displayed on client system 130).

In accordance with block 1640, the example may evaluate the next search result (B000PPLHOI) in the search result group. In accordance with block 1620, the illustrated example may include determining whether the search result label (B000KENT9K; column 1710 of row 1750) was previously added to the set of covered labels (column 1720 of row 1745). In the illustrated case, the label has been previously added to the set of covered labels (e.g., B000KENT9K is a member of set indicated at column 1720 of row 1745). Accordingly, the example may include removing the search result from the search result group (e.g., search result group 330) (in accordance with block 1630 of FIG. 16). The example may also include indicating the search result is not to be displayed (column 1730 of row 1750). The label cover method described herein may be applied to the remaining search results (column 1700, rows 1755-1775) to obtain the additional results of the illustrated table.

Figure 18:
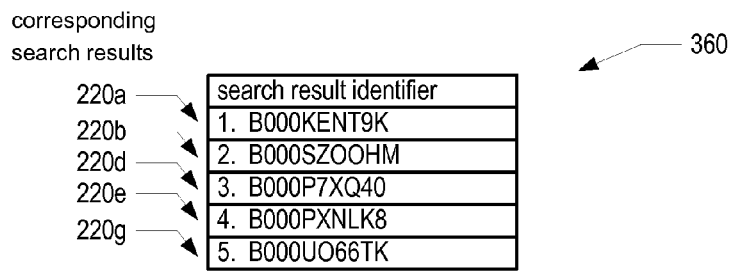
FIG. 18 illustrates a table of search results generated by a search result conditioning component, according to some embodiments.
Figure 19:
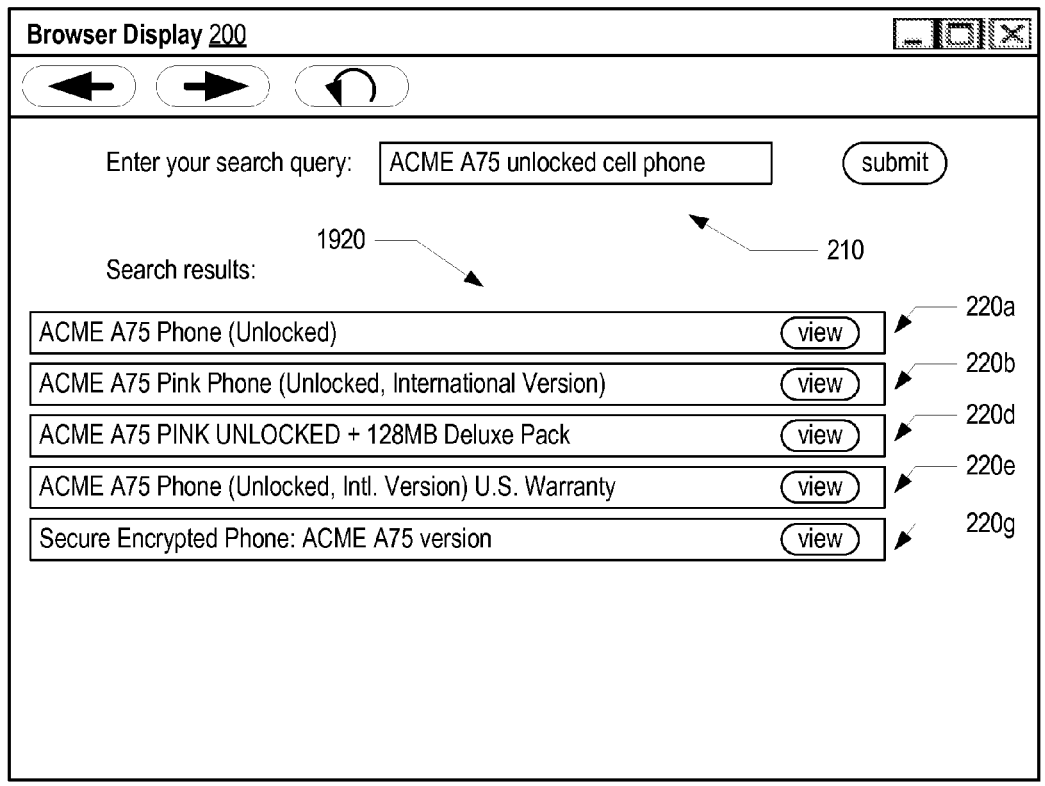
FIG. 19 illustrates an exemplary display of search results, according to some embodiments.

In this example, the resulting modified or "conditioned" search results are illustrated as modified search result group 360 of FIG. 18. Such search result may be provided from the search result conditioning component 100 to the electronic marketplace interface 115 and/or client system 130 (as is illustrated in FIG. 3). Additionally, FIG. 19 illustrates such modified search results as search results 1920 presented to a user (e.g., user 102) of the client system. In various embodiments, electronic marketplace interface 115 may provide the conditioned search results to the client system (e.g., conditioned search results 370 of FIG. 3) according to a variety of data formats. In one embodiment, the search results are provided to the client system as part of a network-based document, such as a web page. For instance, electronic marketplace interface 115 may provide conditioned search results 370 to the client system in response to search query 300; such search results 370 may be provided as part of a web page, as illustrated in the exemplary display of FIG. 19.

Label Cover Method—A Second Example

In the illustrated example of FIG. 20, the labels derived using the degree sorting method will be utilized to illustrate the label cover method. In accordance with block 1610, the label cover method may be applied to each search result of the search result group, as illustrated by the search results of column 2000 of rows 2040-2075. In accordance with block 1620, the illustrated example may include determining whether the label (B000PPLHOI; row 2040, column 2010) of the first search result (B000KENT9K; row 2040, column 2000) has been previously added to the set of covered labels. Since this is the first iteration of the method in this example, no labels may have been previously added to the set of covered labels. Accordingly, the example may include adding the search result identifier's label (B000PPLHOI; column 2010 of row 2040) to the set of covered labels as indicated at column 2020 of row 2040 (in accordance with block 1625 of FIG. 16). In accordance with block 1635 of FIG. 16, the example may also include indicating that the search result is to be displayed (column 2030 of row 2040) (e.g., displayed on client system 130).

In accordance with block 1640, the example may evaluate the next search result (B000SZOOHM) in the search result group. In accordance with block 1620, the illustrated example may include determining whether the search result label (B000PPLHOI; column 2010 of row 2045) was previously added to the set of covered labels (column 2020 of row 2040). In the illustrated case, the label has been previously added to the set of covered labels (e.g., B000PPLHOI is a member of set indicated at column 2020 of row 2040). Accordingly, the example may include removing the search result from the search result group (e.g., search result group 330) (in accordance with block 1630 of FIG. 16). The example may also include indicating the search result is not to be displayed (column 2030 of row 2045). The label cover method described herein may be applied to the remaining search results (column 2000, rows 2050-2075) to obtain the additional results of the illustrated table.

Figure 21:
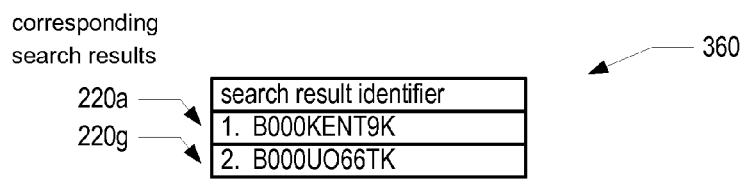
FIG. 21 illustrates a table of search results generated by a search result conditioning component, according to some embodiments.
Figure 22:
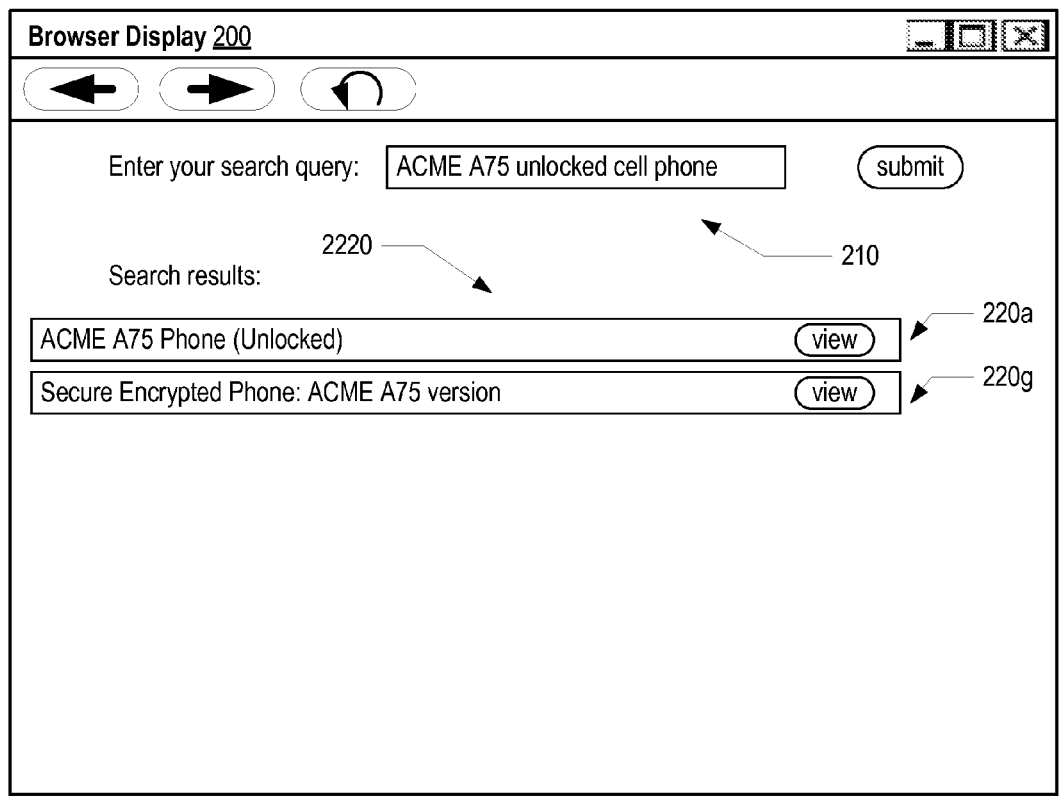
FIG. 22 illustrates an exemplary display of search results, according to some embodiments.

In this example, the resulting modified or "conditioned" search results are illustrated as modified search result group 360 of FIG. 21. Such search result may be provided from the search result conditioning component 100 to the electronic marketplace interface 115 and/or client system 130 (as is illustrated in FIG. 3). Additionally, FIG. 22 illustrates such modified search results as search results 2220 presented to a user (e.g., user 102) of the client system. In various embodiments, electronic marketplace interface 115 may provide the conditioned search results to the client system (e.g., conditioned search results 370 of FIG. 3) according to a variety of data formats. In one embodiment, the search results are provided to the client system as part of a network-based document, such as a web page. For instance, electronic marketplace interface 115 may provide conditioned search results 370 to the client system in response to search query 300; such search results 370 may be provided as part of a web page, as illustrated in the exemplary display of FIG. 22.

Measures of Similarity—Different Degrees of Similarity

In some embodiments, the methods (including the edge cover method and label cover method) described herein may include determining (e.g., as described above with respect to block 810) and removing (e.g., as described above with respect to block 820 and block 1630) search results of a given search result group that have a requisite measure of similarity having multiple (e.g., 1–n) degrees with respect to a given search result being evaluated (as used herein, the term "degree" may correspond to separation by one edge). For instance, consider search result B000SZOOHM of FIG. 7. In some embodiments, a requisite measure of similarity may correspond to a single degree of similarity. In this case, B000PPLHOI would be the only search result to be determined to have a requisite measure of similarity with respect to search result B000SZOOHM. Accordingly, when evaluating B000SZOOHM, B000SZOOHM may be the only search result removed from the search result group. However, in other embodiments, a requisite measure of similarity may correspond to multiple (e.g., two or more) degrees of similarity. For example, in one embodiment, the requisite measure of similarity may correspond to two degrees of similarity. In this case B000PXNLK8, B000KENT9K, B000PGE8L6, B000PMJ23E, and B000P7XQ40 (in addition to B000PPLHOI) would also be determined as having a requisite measure of similarity with respect to B000SZOOHM since each of such search results are within two degrees of similarity with respect to B000SZOOHM.

Connected Search Result Groups

In some embodiments, the methods (including the edge cover method and label cover method) described herein may include determining (e.g., as described above with respect to block 810) and removing (e.g., as described above with respect to block 820 and block 1630) search results of the search result group that have a requisite measure of similarity having any degree of similarity with respect to the search result being evaluated. Such search results may be referred to as a "connected search result group." A given connected search result group may include one or more search results that are connected, whether directly or via intermediate search results, by an edges. For instance, as illustrated in FIG. 7, search results B000SZOOHM, B000PPLHOI, B000PXNLK8, B000KENT9K, B000PGE8L6, B000PMJ23E, and B000P7X040 may form one connected search result group. Since B000UO66TK is not "connected" to any of B000SZOOHM, B000PPLHOI, B000PXNLK8, B000KENT9K, B000PGE8L6, B000PMJ23E, and B000P7XQ40 (i.e., no edge exists between B000UO66TK and the other search results of FIG. 7), B000UO66TK is not a member of the same connected search result group. Since B000UO66TK is not connected to any other search result group of FIG. 7 (i.e., no edge exists between B000UO66TK and the other search results of FIG. 7, B000UO66TK may be a member of its own connected search result group that includes only one search result.

Note that in embodiments where connected search result groups are utilized as the basis for determining similarity between search results, the search result conditioning component may select a representative search result of the connected search result group and remove (or hide) all other search results of the search result group. Such a representative may be chosen based on one or more factors including but not limited to relevance of the product corresponding to the sales listing that is a candidate to be the representative (e.g., a measure of how relevant the product is to the search query), the sales rank of the product corresponding to the sales listing that is a candidate to be the representative, the number of views of the sales listing that is a candidate to be the representative (e.g., web page views of the sales listing), and consumer ratings of the product corresponding to the sales listing that is a candidate to be the representative.

In various embodiments, the size of the connected search result groups may be manipulated by varying the threshold applied to relationship information (e.g., varying the threshold applied to the similarity scores). For instance, a low threshold may yield larger connected search result groups than a higher threshold. For instance, with respect to FIG. 7, had a threshold of 0.10 been applied to the relationship information of FIG. 6 (utilizing any of the various techniques described above), the graph of FIG. 7 would instead illustrate a single connected search result group. Likewise had a threshold of 0.90 been applied to the relationship information of FIG. 6 (utilizing any of the various techniques described above), the graph of FIG. 7 would instead illustrate more than two connected search result groups. In this way, manipulating the threshold may change the composition and number of connected search result groups of various similarity data representations.

Hiding Search Results

Figure 23A:
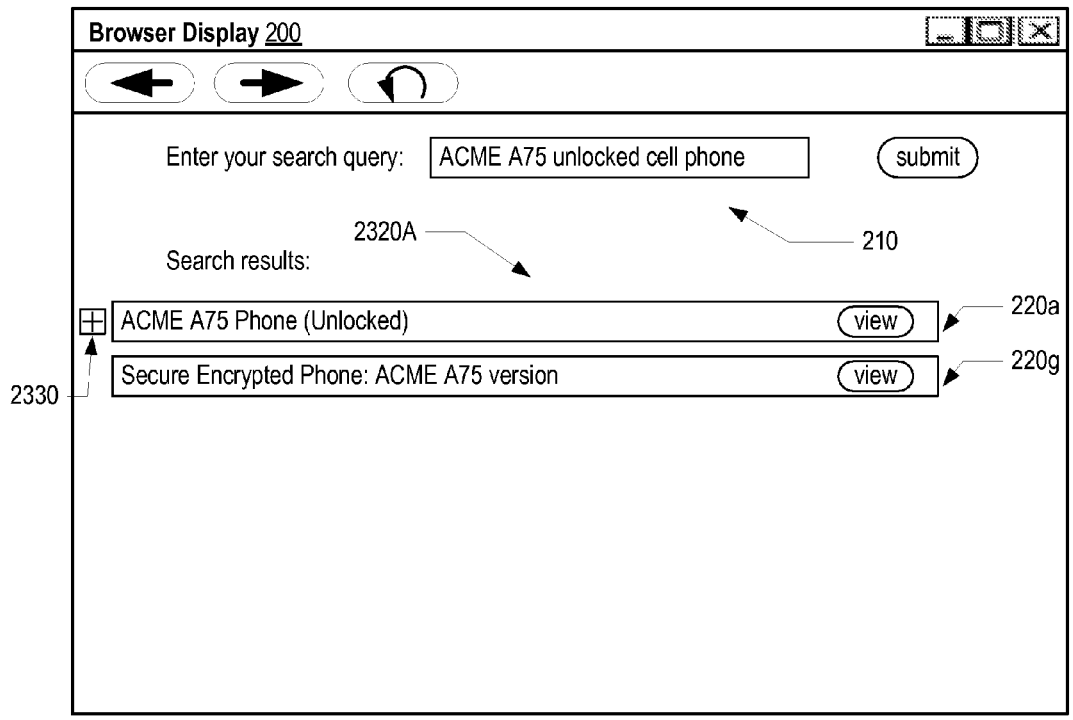
FIGS. 23A-B illustrate an exemplary display of search results, according to some embodiments.
Figure 23B:
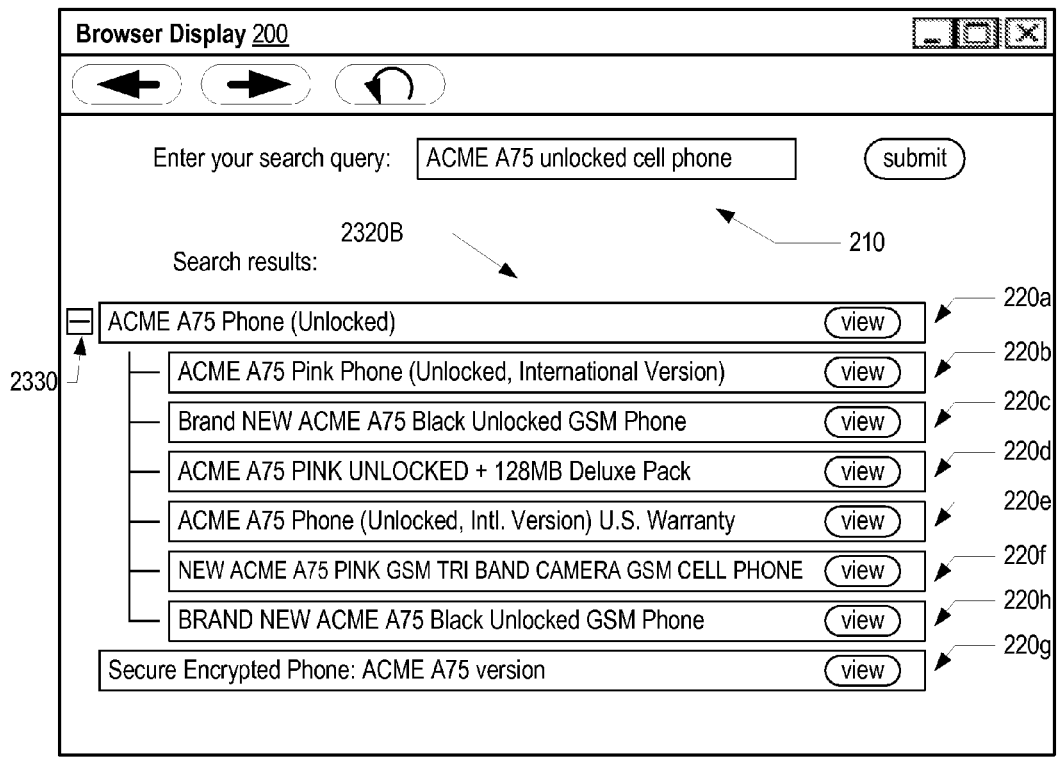

In the various embodiments described herein, some search results of a search result group (e.g., search result group 330) may be removed to create a modified or conditioned search result group (e.g., search result groups 360 and/or 370). In some embodiments, instead of generating modified search result groups by removing search results from a search result group, the search result conditioning component may be configured to indicate that search results be hidden from view. For instance, for any given search result determined to be removed from a search result group, the search result conditioning component may, instead of completely removing the search result, indicate that such search result is to be hidden. For instance, conditioned search results 360, which are provided to electronic marketplace 115, may include one or more search results indicated as hidden by the search result conditioning component 100. Accordingly, electronic marketplace 115 may be configured to provide conditioned search results 370, including hidden search results, to client system 130. FIGS. 23A and 23B illustrate two instances of browser display 200 that may be utilized to provide hidden search results to a user. FIG. 23A may illustrates search results 2320A, which is similar to the browser display described above with respect to FIG. 22. However, the display of FIG. 23A includes a hidden search result toggle control 2330. By selecting hidden search result toggle control 2330, a user (e.g., user 102) may view hidden search results that have a requisite measure of similarity with respect to the visible search result. FIG. 23B illustrates an expanded view of the search result display (e.g., subsequent to the selection of toggle control 2330). The expanded view includes search results 2320B, which includes search results previously indicated as hidden by the search result conditioning component described herein.

Exemplary System

Various embodiments of a system and method for conditioning search results, as described herein, may be executed on one or more computer systems, which may interact with various other devices. One such computer system is computer system 2400 illustrated by FIG. 24. Computer system 2400 may be capable of implementing search result conditioning component, such as search result conditioning component 100. In the illustrated embodiment, computer system 2400 includes one or more processors 2410 coupled to a system memory 2420 via an input/output (I/O) interface 2430. Computer system 2400 further includes a network interface 2440 coupled to I/O interface 2430, and one or more input/output devices 2450, such as cursor control device 2460, keyboard 2470, and display(s) 2480. In some embodiments, it is contemplated that embodiments may be implemented using a single instance of computer system 2400, while in other embodiments multiple such systems, or multiple nodes making up computer system 2400, may be configured to host different portions or instances of embodiments. For example, in one embodiment some elements may be implemented via one or more nodes of computer system 2400 that are distinct from those nodes implementing other elements.

In various embodiments, computer system 2400 may be a uniprocessor system including one processor 2410, or a multiprocessor system including several processors 2410 (e.g., two, four, eight, or another suitable number). Processors 2410 may be any suitable processor capable of executing instructions. For example, in various embodiments processors 2410 may be general-purpose or embedded processors implementing any of a variety of instruction set architectures (ISAs), such as the x86, PowerPC, SPARC, or MIPS ISAs, or any other suitable ISA. In multiprocessor systems, each of processors 2410 may commonly, but not necessarily, implement the same ISA.

System memory 2420 may be configured to store program instructions 2422 and/or data 2432 accessible by processor 2410. In various embodiments, system memory 2420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing search result conditioning component, such as search result conditioning component 100 described above, are shown stored within system memory 2420 as search result conditioning component 100. In other embodiments, program instructions and/or data may be received, sent or stored upon different types of computer-accessible media or on similar media separate from system memory 2420 or computer system 2400. Generally speaking, a computer-accessible medium may include storage media or memory media such as magnetic or optical media, e.g., disk or CD/DVD-ROM coupled to computer system 2400 via I/O interface 2430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2440.

In one embodiment, I/O interface 2430 may be configured to coordinate I/O traffic between processor 2410, system memory 2420, and any peripheral devices in the device, including network interface 2440 or other peripheral interfaces, such as input/output devices 2450. In some embodiments, I/O interface 2430 may perform any necessary protocol, timing or other data transformations to convert data signals from one component (e.g., system memory 2420) into a format suitable for use by another component (e.g., processor 2410). In some embodiments, I/O interface 2430 may include support for devices attached through various types of peripheral buses, such as a variant of the Peripheral Component Interconnect (PCI) bus standard or the Universal Serial Bus (USB) standard, for example. In some embodiments, the function of I/O interface 2430 may be split into two or more separate components, such as a north bridge and a south bridge, for example. Also, in some embodiments some or all of the functionality of I/O interface 2430, such as an interface to system memory 2420, may be incorporated directly into processor 2410.

Figure 24:
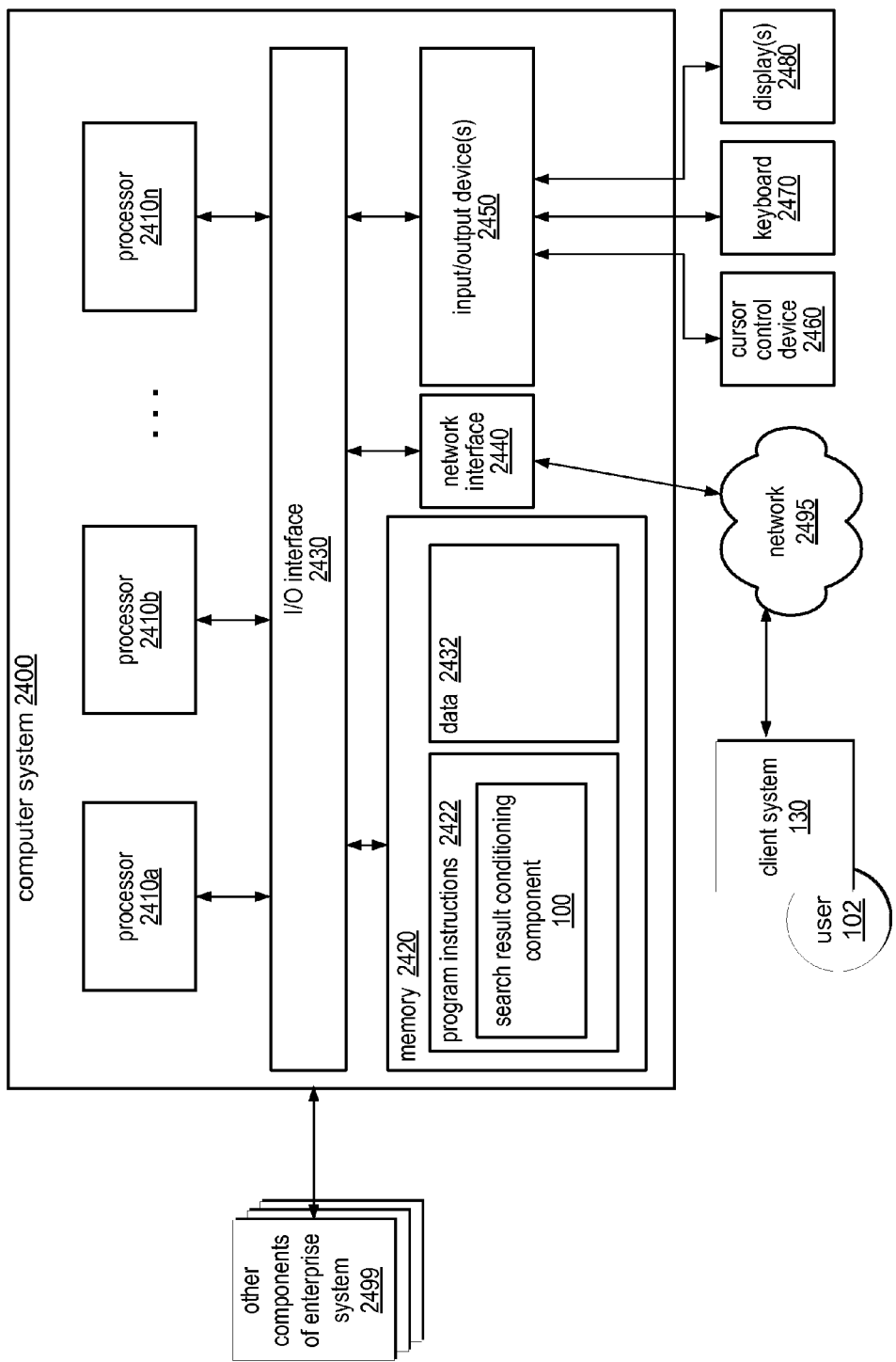
FIG. 24 illustrates an exemplary system for implementing a search result conditioning component, according to some embodiments.

Network interface 2440 may be configured to allow data to be exchanged between computer system 2400 and other devices attached to a network, such as other computer systems (e.g., client system 130 and/or other components of enterprise system 110 illustrated as item 2499 of FIG. 24), or between nodes of computer system 2400. In various embodiments, network interface 2440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2450 may, in some embodiments, include one or more display terminals, keyboards, keypads, touchpads, scanning devices, voice or optical recognition devices, or any other devices suitable for entering or accessing data by one or more computer systems 2400. Multiple input/output devices 2450 may be present in computer system 2400 or may be distributed on various nodes of computer system 2400. In some embodiments, similar input/output devices may be separate from computer system 2400 and may interact with one or more nodes of computer system 2400 through a wired or wireless connection, such as over network interface 2440.

As shown in FIG. 24, memory 2420 may include program instructions 2422 configured to implement a search result conditioning component, such as search result conditioning component 100. In one embodiment, search result conditioning component 100 may implement the methods described above, such as the methods illustrated by FIGS. 8, 12, 14 and 16. In other embodiments, different elements and data may be included.

Those skilled in the art will appreciate that computer system 2400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2400 may be transmitted to computer system 2400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure.

The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
    a memory comprising program instructions; and
    one or more processors coupled to said memory, wherein the program instructions are executable by at least one of said one or more processors to implement a search result conditioning component configured to:
        determine a search result group comprising a plurality of search results, wherein the plurality of search results are results of a search query, wherein the search result group includes a connected graph comprising multiple nodes and multiple edges each connecting a distinct pair of nodes, wherein each node represents a search result of said plurality of search results, wherein each node includes a search result identifier that is different than the other nodes of the multiple nodes, wherein each edge indicates the pair of nodes connected by that edge are similar search results with a measure of similarity between the pair of nodes greater than a requisite measure of similarity;
        for each node representing a given search result of the search result group:
            apply one or more similarity criteria to each of the multiple nodes of the connected graph to identify a respective similar group of nodes that are similar to the given search result;
            sort the nodes of the similar group of nodes and the node representing the given search result into an order based on the respective search result identifiers of the nodes of the similar group of nodes and the node representing the given search result such that each sorted group includes a respective first node occurring before the one or more other nodes within the order of the sorted group; and
            responsive to the order of nodes resulting from the sort, label the given search result with the search result identifier of the respective first node from the sorted similar group of nodes;
        wherein at least some search results of the search result group are assigned the same label;
        modify the search result group, wherein to modify the search result group the search result conditioning component is configured to remove at least one search result from the search result group dependent upon the label assigned to the at least one search result being shared with at least one other search result of the search result group; and
        output the modified search result group.

2. The system of claim 1, wherein for each node representing the given search result and the respective group of similar nodes, the sorting performed by the search result conditioning component is a lexicographical sorting based on the search result identifiers of the nodes of the similar group of nodes and the node representing the given search result.

3. The system of claim 2, wherein the search result identifier of the respective first node is an earliest identifier of the lexicographically sorted identifiers.

4. The system of claim 1, wherein the search result conditioning component is configured to, for each respective search result of the search result group, determine a quantity of other search results of the search result group that are similar to the respective search result as being equivalent to the quantity of edges between the node representing the respective search result and one or more other nodes that represent search results in the connected graph.

5. The system of claim 4, wherein to label the given search result, the search result conditioning component is configured to:
    determine a set of similar search results that includes the given search result and one or more particular search results based on the connectivity of the connected graph;
    determine a first search result of said set of similar search results, the first search result having a determined quantity that is higher than a determined quantity for each of the other search results; and
    assign a common label to each search result in the set of similar search results, wherein said particular label is the same as an identifier of said first search result.

6. The system of claim 1, wherein the search result conditioning component is configured to receive said search query from an electronic marketplace interface configured to serve a plurality of clients, wherein said search result conditioning component is configured to provide the modified search result group to said electronic marketplace interface.

7. The system of claim 1, wherein to modify said search result group, said search result conditioning component is configured to indicate one or more of the search results of the search result group as hidden.

8. The system of claim 1, wherein each search result corresponds to an item or service offered for sale.

9. The system of claim 1, wherein at least a subset of said search results of said search result group are indicated as being related to each other by different degrees of similarity, wherein said requisite measure of similarity specifies a particular degree of similarity, wherein the search result conditioning component is configured to remove a given search result of said subset from the search result group in response to determining that a particular degree of similarity between said given search result and another given search result is greater than said particular degree of similarity.

10. A computer-implemented method, comprising:
   determining a search result group comprising a plurality of search results, wherein the plurality of search results are results of a search query, wherein the search result group includes a connected graph comprising multiple nodes and multiple edges each connecting a distinct pair of nodes, wherein each node represents a search result of said plurality of search results, wherein each node includes a search result identifier that is different than the other nodes of the multiple nodes, wherein each edge indicates the pair of nodes connected by that edge are similar search results with a measure of similarity between the pair of nodes greater than a requisite measure of similarity;
   for each node representing a given search result of the search result group;
      applying one or more similarity criteria to each of the multiple nodes of the connected graph to identify a respective similar group of nodes that are similar to the given search result;
      sorting the nodes of the similar group of nodes and the node representing the given search result into an order based on the respective search result identifiers of the nodes of the similar group of nodes and the node representing the given search result such that each sorted group includes a respective first node occurring before the one or more other nodes within the order of the sorted group; and
      responsive to the order of nodes resulting from the sorting, labeling the given search result with the search result identifier of the respective first node from the similar sorted group of nodes; wherein at least some search results of the search result group are assigned the same label;
   modifying the search result group, wherein modifying the search result group comprises removing at least one search result from the search result group dependent upon the label assigned to the at least one search result being shared with at least one other search result of the search result group; and
   outputting the modified search result group.

11. The computer-implemented method of claim 10, wherein for each node representing the given search result and the respective group of similar nodes, said sorting comprises lexicographically sorting the nodes of that group based on the search result identifiers of the nodes of the similar group of nodes and the node representing the given search result.

12. The computer-implemented method of claim 11, wherein the search result identifier of the respective first node is an earliest identifier of the lexicographically sorted identifiers.

13. The computer-implemented method of claim 10, further comprising for each respective search result of the search result group, determining a quantity of other search results of the search result group that are similar to the respective search result as being equivalent to the quantity of edges between the node representing the respective search result and one or more other nodes that represent search results in the connected graph.

14. The computer-implemented method of claim 13, wherein labeling the given search result comprises:
   determining a set of similar search results that includes the given search result and one or more particular search results based on the connectivity of the connected graph;
   determining a first search result of said set of similar search results, the first search result having a determined quantity that is higher than a determined quantity for each of the other search results; and
   assigning a common label to each search result in the set of similar search results, wherein said particular label is the same as an identifier of said first search result.

15. The computer-implemented method of claim 10, further comprising:
   receiving said search query from an electronic marketplace interface configured to serve a plurality of clients, and
   providing the modified search result group to said electronic marketplace interface.

16. The computer-implemented method of claim 10, wherein modifying said search result group comprises indicating one or more of the search results of the search result group as hidden.

17. The computer-implemented method of claim 10, wherein each search result corresponds to an item or service offered for sale.

18. The computer-implemented method of claim 10, wherein at least a subset of said search results of said search result group are indicated as being related to each other by different degrees of similarity, wherein said requisite measure of similarity specifies a particular degree of similarity, wherein the method comprises removing a given search result of said subset from the search result group in response to determining that a particular degree of similarity between said given search result and another given search result is greater than said particular degree of similarity.

19. A non-transitory computer-readable storage medium storing program instructions computer-executable to implement a search result conditioning component configured to:
   determine a search result group comprising a plurality of search results, wherein the plurality of search results are results of a search query, wherein the search result group includes a connected graph comprising multiple nodes and multiple edges each connecting a distinct pair of nodes, wherein each node represents a search result of said plurality of search results, wherein each node includes a search result identifier that is different than the other nodes of the multiple nodes, wherein each edge indicates the pair of nodes connected by that edge are similar search results with a measure of similarity between the pair of nodes greater than a requisite measure of similarity;
   for each node representing a given search result of the search result group:
      apply one or more similarity criteria to each of the multiple nodes of the connected graph to identify a respective similar group of nodes that are similar to the given search result;
      sort the nodes of the similar group of nodes and the node representing the given search result into an order based on the respective search result identifiers of the nodes of the similar group of nodes and the node representing the given search result such that each sorted group includes a respective first node occurring before the one or more other nodes within the order of the sorted group; and
      responsive to the order of nodes resulting from the sort, label the given search result with the search result identifier of the respective first node from the sorted similar group of nodes; wherein at least some search results of the search result group are assigned the same label;

modify the search result group, wherein to modify the search result group the search result conditioning component is configured to remove at least one search result from the search result group dependent upon the label assigned to the at least one search result being shared with at least one other search result of the search result group; and output the modified search result group.

20. The medium of claim 19, wherein for each node representing the given search result and the respective group of similar nodes, the sorting performed by the search result conditioning component is a lexicographical sorting based on the search result identifiers of the nodes of the similar group of nodes and the node representing the given search result.

21. The medium of claim 20, wherein the search result identifier of the respective first node is an earliest identifier of the lexicographically sorted identifiers.

22. The medium of claim 19, wherein the search result conditioning component is configured to, for each respective search result of the search result group, determine a quantity of other search results of the search result group that are similar to the respective search result as being equivalent to the quantity of edges between the node representing the respective search result and one or more other nodes that represent search results in the connected graph.

23. The medium of claim 22, wherein to label the given search result, the search result conditioning component is configured to:

determine a set of similar search results that includes the given search result and one or more particular search results based on the connectivity of the connected graph;

determine a first search result of said set of similar search results, the first search result having a determined quantity that is higher than a determined quantity for each of the other search results; and assign a common label to each search result in the set of similar search results, wherein said particular label is the same as an identifier of said first search result.

24. The medium of claim 19, wherein the search result conditioning component is configured to receive said search query from an electronic marketplace interface configured to serve a plurality of clients, wherein said search result conditioning component is configured to provide the modified search result group to said electronic marketplace interface.

25. The medium of claim 19, wherein to modify said search result group, said search result conditioning component is configured to indicate one or more of the search results of the search result group as hidden.

26. The medium of claim 19, wherein each search result corresponds to an item or service offered for sale.

27. The medium of claim 19, wherein at least a subset of said search results of said search result group are indicated as being related to each other by different degrees of similarity, wherein said requisite measure of similarity specifies a particular degree of similarity, wherein the search result conditioning component is configured to remove a given search result of said subset from the search result group in response to determining that a particular degree of similarity between said given search result and another given search result is greater than said particular degree of similarity.

28. The system of claim 1, wherein when labeling each search result of the search result group, the search result conditioning component is configured to label each search result in descending order of relevance to said search query.

29. The computer-implemented method of claim 10, wherein labeling each search result of the search result group comprises labeling each search result in descending order of relevance to said search query.

30. The medium of claim 19, wherein when labeling each search result of the search result group, the search result conditioning component is configured to label each search result in descending order of relevance to said search query.

* * * * *